(12) United States Patent
Sartori et al.

(10) Patent No.: US 9,055,515 B2
(45) Date of Patent: Jun. 9, 2015

(54) SYSTEM AND METHOD FOR SIGNALING A LOCATION OF A CONTROL CHANNEL

(75) Inventors: Philippe Sartori, Algonquin, IL (US); Bingyu Qu, Schaumburg, IL (US); Weimin Xiao, Rolling Meadows, IL (US); Brian Classon, Palatine, IL (US); Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 10 days.

(21) Appl. No.: 13/436,375

(22) Filed: Mar. 30, 2012

(65) Prior Publication Data

US 2012/0250641 A1    Oct. 4, 2012

Related U.S. Application Data

(60) Provisional application No. 61/471,049, filed on Apr. 1, 2011, provisional application No. 61/470,940, filed on Apr. 1, 2011, provisional application No. 61/471,055, filed on Apr. 1, 2011, provisional application No. 61/471,061, filed on Apr. 1, 2011.

(51) Int. Cl.
*H04W 48/12* (2009.01)

(52) U.S. Cl.
CPC .................................... *H04W 48/12* (2013.01)

(58) Field of Classification Search
CPC ............................. H04W 72/04; H04W 48/12
USPC .......................... 370/254, 255, 311, 328, 329
See application file for complete search history.

(56) References Cited

U.S. PATENT DOCUMENTS

| 8,204,512 B2 * | 6/2012 | Dietrich et al. ............. 455/456.2 |
| 8,433,251 B2 * | 4/2013 | Chen et al. ....................... 455/68 |
| 8,441,996 B2 | 5/2013 | Kim et al. |

(Continued)

FOREIGN PATENT DOCUMENTS

| CN | 101589582 A | 11/2009 |
| CN | 101626625 A | 1/2010 |

(Continued)

OTHER PUBLICATIONS

International Search Report received in Patent Cooperation Treaty Application No. PCT/CN2012/073466, mailed Jul. 5, 2012, 4 pages.
Written Opinion of the International Searching Authority received in Patent Cooperation Treaty Application No. PCT/CN2012/073466, mailed Jul. 5, 2012, 5 pages.

(Continued)

*Primary Examiner* — Un C Cho
*Assistant Examiner* — Natali N Pascual Peguero
(74) *Attorney, Agent, or Firm* — Slater & Matsil, L.L.P.

(57) ABSTRACT

A method for transmitting control information to a wireless node in a communications system includes mapping, by a communications controller, the control information onto resources associated with a wireless node specific search space, the wireless node specific search space being located in a first data region of a first subframe, the first subframe including a first common search space in addition to the wireless node specific search space. The method also includes generating, by the communications controller, a location indicator identifying a location of the wireless node specific search space. The method further includes transmitting, by the communications controller, the first subframe to the wireless node, and transmitting, by the communications controller, the location indicator to the wireless node.

30 Claims, 20 Drawing Sheets

(56) References Cited

U.S. PATENT DOCUMENTS

| | | | |
|---|---|---|---|
| 8,538,411 B2* | 9/2013 | Kwon et al. | 455/422.1 |
| 2008/0032632 A1 | 2/2008 | Choi et al. | |
| 2008/0239977 A1 | 10/2008 | Xue et al. | |
| 2009/0003274 A1 | 1/2009 | Kwak et al. | |
| 2009/0088148 A1 | 4/2009 | Chung et al. | |
| 2009/0161618 A1 | 6/2009 | Johansson et al. | |
| 2010/0103901 A1 | 4/2010 | Miki et al. | |
| 2010/0111226 A1 | 5/2010 | Ko et al. | |
| 2010/0135273 A1* | 6/2010 | Kim | 370/344 |
| 2010/0177835 A1 | 7/2010 | Dounaev et al. | |
| 2010/0246518 A1 | 9/2010 | Gheorghiu et al. | |
| 2010/0254268 A1 | 10/2010 | Kim et al. | |
| 2010/0303011 A1 | 12/2010 | Pan et al. | |
| 2010/0322135 A1* | 12/2010 | Van Lieshout et al. | 370/312 |
| 2010/0322154 A1* | 12/2010 | Chen et al. | 370/328 |
| 2011/0021228 A1* | 1/2011 | Kim et al. | 455/507 |
| 2011/0044391 A1* | 2/2011 | Ji et al. | 375/260 |
| 2011/0103295 A1 | 5/2011 | Khandekar et al. | |
| 2011/0142000 A1 | 6/2011 | Han et al. | |
| 2011/0158104 A1 | 6/2011 | Frenger et al. | |
| 2011/0243090 A1 | 10/2011 | Grovlen et al. | |
| 2011/0273996 A1 | 11/2011 | Kim et al. | |
| 2011/0299490 A1 | 12/2011 | Nordstrom et al. | |
| 2012/0063401 A1 | 3/2012 | Xue et al. | |
| 2012/0069793 A1 | 3/2012 | Chung et al. | |
| 2012/0082130 A1 | 4/2012 | Xue et al. | |
| 2012/0113889 A1 | 5/2012 | Noh et al. | |

FOREIGN PATENT DOCUMENTS

| | | |
|---|---|---|
| CN | 101682406 A | 3/2010 |
| CN | 101682419 A | 3/2010 |
| CN | 101868003 A | 10/2010 |
| CN | 101868033 A | 10/2010 |
| CN | 101908955 A | 12/2010 |
| CN | 101932077 A | 12/2010 |
| WO | WO 2009/041779 A1 | 4/2009 |
| WO | 2010058245 A1 | 5/2010 |
| WO | WO 2010/070197 A1 | 6/2010 |
| WO | WO 2010/082877 A1 | 7/2010 |
| WO | 2010129605 A1 | 11/2010 |
| WO | WO 2010/145530 A1 | 12/2010 |
| WO | WO 2010/145532 A1 | 12/2010 |
| WO | WO 2010140748 A1 * | 12/2010 |

OTHER PUBLICATIONS

"3$^{rd}$ Generation Partnership Project; Technical Specification Group Radio Access Network; Evolved Universal Terrestrial Radio Access (E-UTRA); Physical layer for relaying operation (Release 10)," 3GPP TS 36.216, V10.1.0, Dec. 2010, 15 pages.

"3$^{rd}$ Generation Partnership Project; Technical Specification Group Radio Access Network; Evolved Universal Terrrestrial Radio Access (E-UTRA); Physical Channels and Modulation (Release 10)," 3GPP TS 36.211, V10.1.0, Mar. 2011, 103 pages.

"3$^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.3.0, Sep. 2011, 79 pages.

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.3.0, Sep. 2011, 122 pages.

"3$^{rd}$ Generation Partnership Project; Technical Specification Group Radio Access Network; Evolved Universal Terrestrial Radio Access (E-UTRA); Physical layer for relaying operation (Release 10)," 3GPP TS 36.216, V10.3.1, Sep. 2011, 16 pages.

ASUSTeK, "PHICH resource allocation in LTE-A," 3GPP TSG RAN WG1 Meeting #60, R1-100994, Agenda Item: 7.1.2, Feb. 22-26, 2010, 3 pages.

"Extended Eurpoean Search Report," Application No. 12763491.3, mailing date: Apr. 1, 2014, 10 pages.

"International Search Report and Written Opinion," International Application No. PCT/CN2012/073473, Applicant: Huawei Technologies Co., Ltd., et al., mailing date: Jul. 12, 2012, 10 pages.

"International Search Report and Written Opinion," International Application No. PCT/CN2012/073474, Applicant: Huawei Technologies Co., Ltd., et al., mailing date: Jul. 5, 2012, 9 pages.

"International Search Report and Written Opinion," International Application No. PCT/CN2012/073461, Applicant: Huawei Technologies Co., Ltd., et al., mailing date: Jul. 12, 2012, 9 pages.

"Office Action Summary," U.S. Appl. No. 13/436,657, Applicant: Qu et al., mailing date: Dec. 26, 2013, 21 pages.

Communication Pursuant to Article 94(3) EPC, received in Application No. 12 763 491.3-1854 mailed Feb. 5, 2015, 8 pages.

3GPP TSG-RAN1 Meeting #64, R1-111217, Taipei, Taiwan, Feb. 21-25, 2011, 12 pages.

* cited by examiner

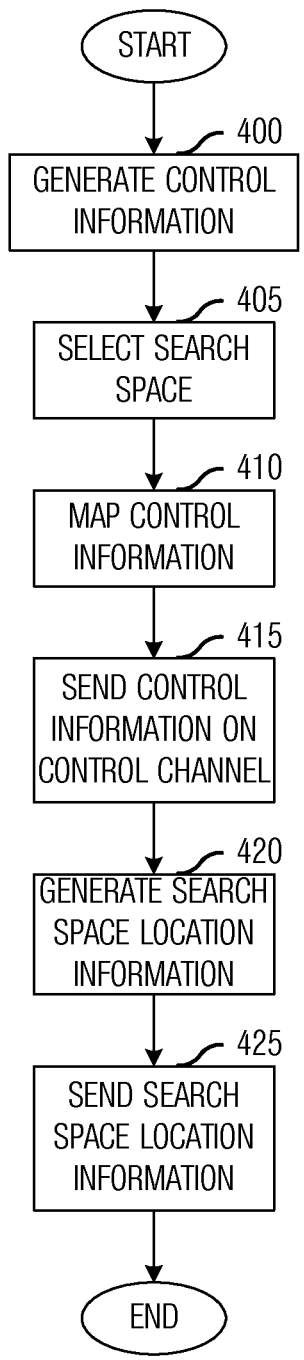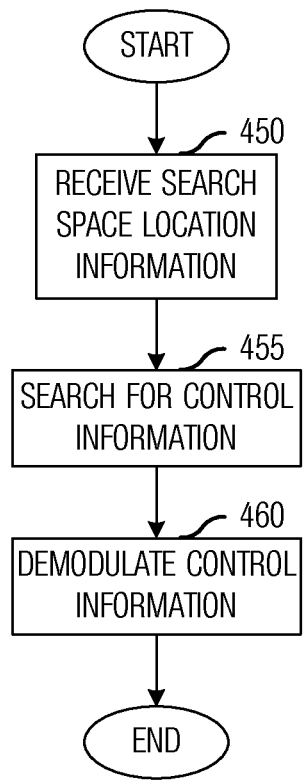
*Fig. 4b*
*Fig. 4a*

SYSTEM AND METHOD FOR SIGNALING A LOCATION OF A CONTROL CHANNEL

This application claims the benefit of U.S. Provisional Applications: No. 61/471,049, filed on Apr. 1, 2011, entitled "System and Method for Signaling a Location of a Control Channel," No. 61/470,940, filed on Apr. 1, 2011, entitled "System and Method for Transmission and Reception of Control Channels in a Communications System," No. 61/471,055, filed on Apr. 1, 2011, entitled "System and Method for Transmission and Reception of Control Channels," and No. 61/471,061, filed on Apr. 1, 2011, entitled "System and Method for Transmission and Reception of Control Channels," which applications are hereby incorporated herein by reference.

CROSS-REFERENCE TO RELATED APPLICATIONS

This application is related to the following co-assigned patent applications: Ser. No. 13/434,449, filed Mar. 29, 2012, entitled "System and Method for Transmission and Reception of Control Channels in a Communications System"; Ser. No. 13/436,590, filed Mar. 30, 2012, entitled "System and Method for Transmitting and Receiving Control Channels"; and Ser. No. 13/436,657, filed Mar. 30, 2012, entitled "System and Method for Transmission and Reception of Control Channels" which applications are hereby incorporated herein by reference.

TECHNICAL FIELD

The present disclosure relates generally to digital communications, and more particularly to a system and method for signaling a location of a control channel.

BACKGROUND

Wireless telephony systems have traditionally been deployed using the concept of a cell, with one base station (BS) (also known as base transceiver station (BTS), Node B (NB), evolved NB (eNB), Access Point, communications controller, and the like) covering a given geographic area. BSs having the same or similar transmit power are typically used. In addition, in order to maximize coverage and to maintain interference at a reasonable level, careful site planning is used. A network deployed in such a manner is usually referred to as a homogenous network (HomoNet).

While such a deployment is optimal when the user density is uniform, in practice, it has serious shortcomings because the user density and traffic demand are rarely uniform. For example, in rural areas, roads are typically the only area where users are present. In urban or suburban areas, there are locations (hot spots) where the traffic demand is higher: such locations may comprise shopping malls, hotels, conference centers, and the like.

In order to improve coverage and user satisfaction, it may be advantageous to cover these hot spots of traffic demands with Low Power Nodes (LPNs). For instance, lower power base stations can be deployed to, e.g., cover lobbies of hotels, portions of shopping malls, and the like. The coverage of such a base station is referred to as a pico cell. When the base station transmit power is even lower, e.g., to cover a single residential unit, the coverage of such a base station is referred to as a femto cell. A network comprising regular base stations and pico cells and/or femto cells is referred to as a heterogeneous network (HetNet).

HetNets present new challenges to the deployment of a cellular system. In particular, the cellular layout may not be as regular as for a HomoNet since it is dependent on the hot spot locations. In particular, it may well happen that a LPN is located close to another base station. The close proximity can create a high level of interference for both user equipment (UE) (also known as mobile station (MS), terminal, user, subscriber, wireless node, and the like) and BSs.

In the Third Generation Partnership Project (3GPP) Long Term Evolution (LTE) Release-10 technical standards, transmissions from the BS comprise both data channels and control channels. The interference can affect both the data channels and control channels. While solutions exist to mitigate interference on the data channels, no such solution has been defined yet for the control channels.

SUMMARY OF THE DISCLOSURE

Example embodiments of the present disclosure which provide a system and method for signaling a location of a control channel.

In accordance with an example embodiment of the present disclosure, a method for transmitting control information to a wireless node in a communications system is provided. The method includes mapping, by a communications controller, the control information onto resources associated with a wireless node specific search space, the wireless node specific search space being located in a first data region of a first subframe, the first subframe including a first common search space in addition to the wireless node specific search space. The method also includes generating, by the communications controller, a location indicator identifying a location of the wireless node specific search space. The method also includes transmitting, by the communications controller, the first subframe to the wireless node, and transmitting, by the communications controller, the location indicator to the wireless node.

In accordance with another example embodiment of the present disclosure, a method for receiving control information in a communications system is provided. The method includes receiving, by a wireless node, a location indicator identifying a location of a wireless specific search space, the wireless node specific search space located in a first data region of a first subframe, the first subframe including a first common search space in addition to the wireless node specific search space. The method also includes searching, by the wireless node, for modulated control information in the wireless node specific search space, and demodulating, by the wireless node, the modulated control information to produce the control information.

In accordance with another example embodiment of the present disclosure, a communications controller is provided. The communications controller includes a processor, and a transmitter operatively coupled to the processor. The processor maps control information onto resources associated with a wireless node specific search space, the wireless node specific search space being located in a first data region of a first subframe, the first subframe including a first common search space in addition to the wireless node specific search space, and generates a location indicator identifying a location of the wireless node specific search space. The transmitter transmits the first subframe to a wireless node, and transmits the location indicator to the wireless.

In accordance with another example embodiment of the present disclosure, a wireless node is provided. The wireless node includes a receiver, and a processor operatively coupled to the receiver. The receiver receives a location indicator identifying a location of a wireless node specific search space, the wireless node specific search space located in a first data region of a first subframe, the first subframe including a first common search space in addition to the wireless node specific search space. The processor searches for modulated control information in the wireless node specific search space, and demodulates the modulated control information to produce control information.

One advantage of an embodiment is that signaling of the location of a control channel helps a receiver by reducing the searching that the receiver may need to perform to find the control channel, thereby reducing computational overhead at the receiver.

A further advantage of an embodiment is that low overhead techniques are utilized to help reduce the signaling overhead, which may reduce the impact of the location signaling on the overall performance of the communications system.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 4a illustrates an example flow diagram of eNB operations for transmitting a resource assignment according to example embodiments described herein;

FIG. 4b illustrates an example flow diagram of UE operations for receiving a resource assignment according to example embodiment described herein;

DETAILED DESCRIPTION OF ILLUSTRATIVE EMBODIMENTS

Figure 1:
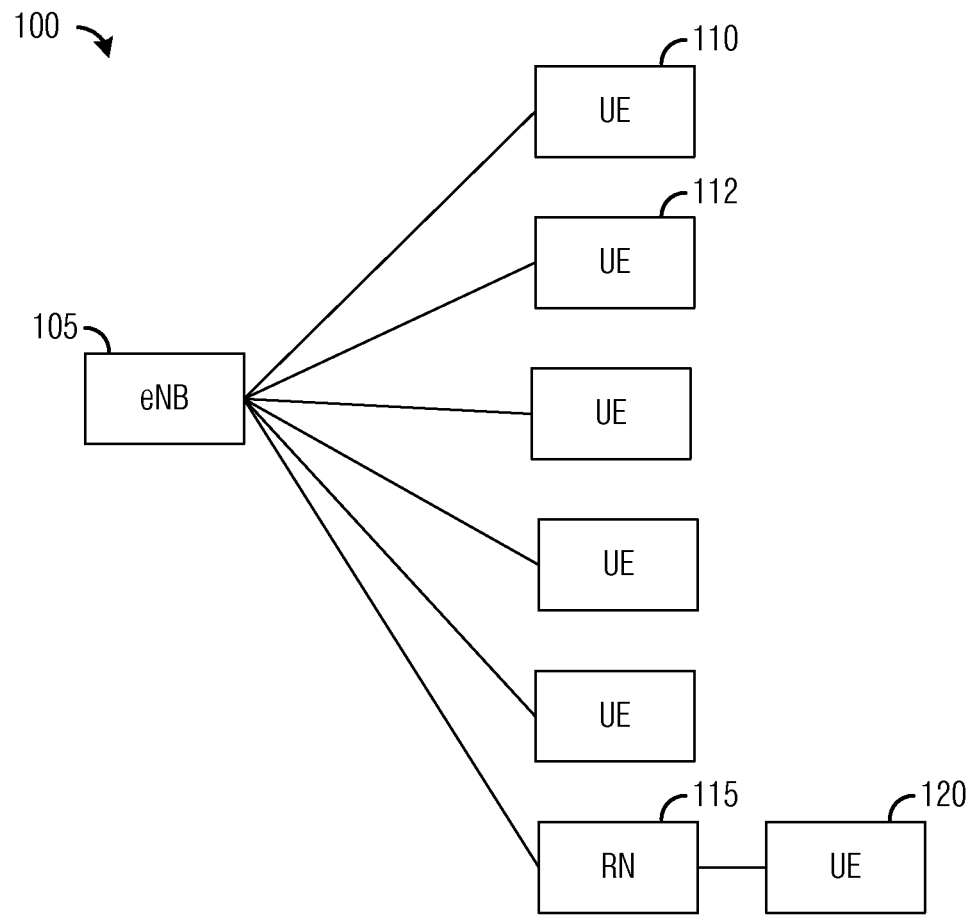
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to signaling a location of a control channel. For example, an eNB generates a location indicator that identifies a location of a control channel located in a data region of a subframe and transmits the location indicator to a wireless node. For example, a wireless node receives a location indicator that identifies a location of a control channel in a data region of a subframe and searches for control information in the control channel according to the location indicator.

The present disclosure will be described with respect to example embodiments in a specific context, namely a HetNet deployment including a 3GPP LTE compliant communications system. The disclosure may also be applied, however, to other HetNet deployments, such as those including 3GPP LTE-Advanced, WiMAX, and the like, compliant communications systems, as well as HetNet deployments with non-standards compliant communications systems.

For 3GPP LTE Release 10 (Release-10) and earlier technical standards, both a Physical Downlink Control Channel (PDCCH) and a Physical Downlink Shared Channel (PDSCH) are defined. The PDSCH may be used to carry data information. The PDCCH may convey control information about a particular PDSCH, such as resource allocation information, modulation and coding information, and information about a Physical Uplink Shared Channel (PUSCH). The PDCCH may be considered to be a first type of control channel. For brevity, the control information for PDSCH and PUSCH can be referred as resource allocation information.

The PDCCH may be located in the first several symbols (e.g., one to four symbols) of a subframe. These PDCCH-bearing symbols may be referred to as a control domain or a control region. Other symbols in the subframe may be used for data transmission, and may be referred to herein as a data domain or a data region. Hence the PDCCH is located in control region while the PDSCH is located in data region.

In the control region, there may be other control channels, such as a Physical Hybrid Indicator Channel (PHICH), which is used to transmit ACK/NACK in response to uplink data transmission, and the Physical Control Format Indicator Channel (PCFICH), which is used to indicate the number of symbols of a control region in a subframe.

In 3GPP LTE Release-11 (LTE-A) or beyond technical standards, an eNB locates a new type of control channel(s), which may be located in the data region, control region, or both of a subframe may be considered. More specifically, when the control channel is located in the data region, a second control region may be defined and uses a portion of the data region. The second control region comprising some combination of time and frequency resources, e.g., resource elements, with a group of resource elements forming a resource block (RB). For example, in one 3GPP LTE configuration, 84 resource elements make up a RB. Similarly, a group of resource elements forms a control channel element. For example, in one 3GPP LTE configuration, 36 resource elements make up a control channel element. At least part of the time and frequency resources (or simply, resources) of the second control region may be used for transmitting control information in the new type of control channel, e.g., a second type of control channel. The resources of the second control region that are not used for transmitting control information may be used for other purposes, such as transmitting data, e.g., on the PDSCH.

One or more resource elements or parts of resource blocks (RBs) from the data region may be allocated for the second control region. As an example, a new second type control channel, a UE Physical Downlink Control Channel (U-PDCCH), may be located in the second control region of the data region (or the control region or both the data region and the control region), and may carry control information for a PDSCH channel or control information for a PUSCH channel. The second channel may carry resource assignments for UEs or other network nodes such as relay nodes. Additionally, the second control region may carry channels analogous to those carried in the first control region, such as the physical hybrid automatic repeat requested indicator channel (PHICH), and the like. A prefix of "U-" may be added to indicate the analogous channel in the second control region, such as the "U-PHICH". Collectively, information carried in these control channels, such as resource assignments (also commonly referred to as resource allocation assignments), configuration information, power control, codebook information, hybrid automatic repeat requested (HARQ) information, and the like, may be referred to as control information. The format and content of these analogous channels may be different from the first control region.

In addition to the first type of control channel and the second type of control channel, there may be other control channel types, including a third type of control channel, which may be transmitted in both the first control region and in the second control region. The information in the two control regions may be the same or it may be different.

FIG. 1 illustrates a communications system 100. Communications system 100 includes an evolved NodeB (eNB) 105, which may also be commonly referred to as a controller, a communications controller, a base station, a NodeB, and the like. Communications system 100 also includes a plurality of User Equipment (UE), such as UE 110, 112, and 120. A UE may also be commonly referred to as a mobile, mobile station, subscriber, user, terminal, wireless node, and the like. In addition, the communication system may include other entities such as Relay Node (RN) 115. The RN may serve one or more UEs, such as UE 120.

Communications between eNB 105 and a given UE may occur over a link that comprises a Un downlink (DL) channel and an Un uplink (UL) channel. UEs not directly served by the RN and RNs may be multiplexed together using and may be allocated different RBs. For 3GPP LTE Release-10, the UE resource assignments are transmitted on the PDCCH.

While it is understood that communications systems may employ multiple eNBs capable of communicating with a number of UEs, only one eNB, a plurality of UEs, and one RN are illustrated for simplicity.

Figure 2A:
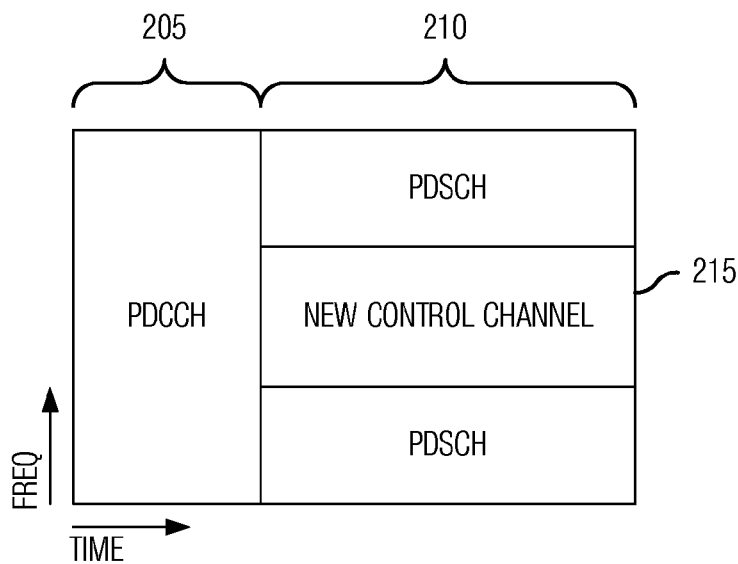
FIGS. 2a through 2d illustrate example subframes according to example embodiments described herein.

FIG. 2a illustrates a first subframe 200. Subframe 200 comprises a first control region 205 and a data region 210. Subframe 200 shows an example for a multicarrier modulation system. As discussed above, first control region 205 may include control signaling, such as a PDCCH, while data region 210 may include data as well as control signaling, which may include a PDSCH, as well as new control channels, such as a U-PHICH or a U-PDCCH.

First control region 205 may also be called a PDCCH control region and may contain the first type of control channels. The new control channels (e.g., the second type of control channels) are located in a new control region 215 (also commonly referred to as a second control region 215), which may be inside data region 210. New control region 215 can also be called the U-PDCCH control region. Although data region 210 may be used to transmit data, no data is shown in FIG. 2a. As shown in FIG. 2a, second control region 215 is located in data region 210, while PDCCH is located in first control region 205.

The representation of the various channels and regions in FIG. 2a is logical in nature with no direct relationship to an actual mapping of specific physical resources. In particular, the resources comprising second control region 215 may be distributed in frequency and are not restricted to be contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed. The PRBs and the VRBs comprise a plurality of resource elements.

Figure 2B:
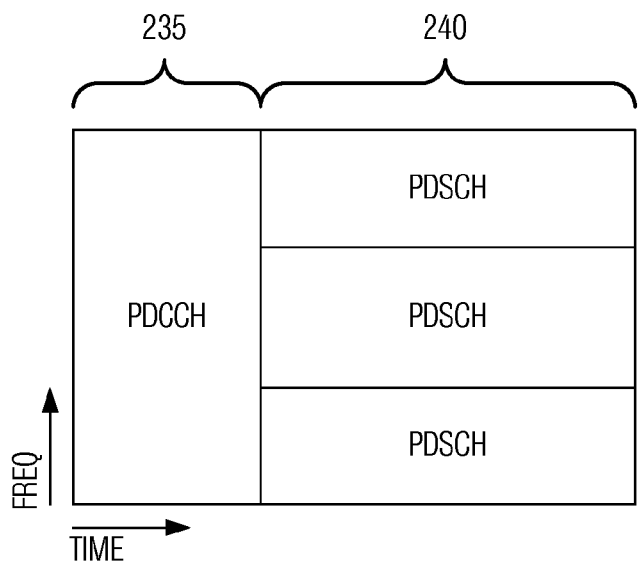

FIG. 2b illustrates a second subframe 230. Subframe 230 comprises a first control region 235 and a data region 240. As discussed above, first control region 235 may include control signaling, such as a PDCCH, while data region 240 may include data without control signaling. First control region 235 may also be called a PDCCH control region.

Figure 2C:
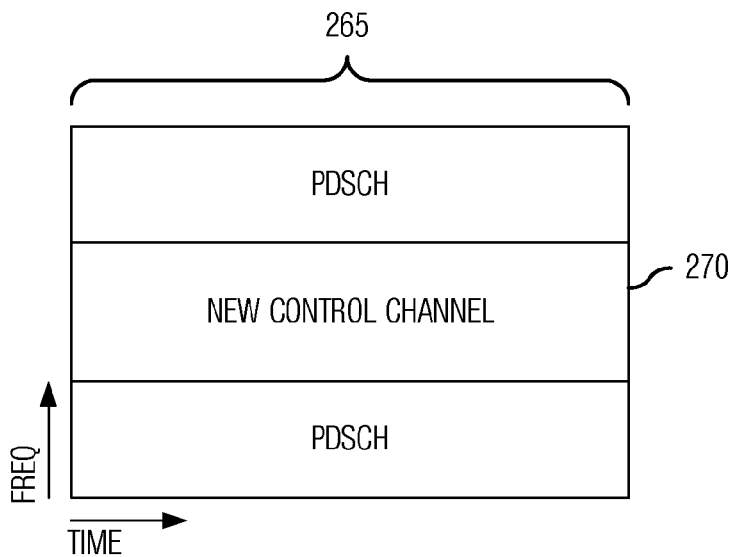

FIG. 2c illustrates a third subframe 260. Subframe 260 comprises a data region 265. As discussed above, data region 265 may include data as well as control signaling, which may include a PDSCH, as well as new control channels, such as a U-PDCCH or a U-PHICH. The new control channels are located in a new control region 270, which may be inside data region 265. New control region 270 may be used to transmit data, but no data is shown in FIG. 2c. As shown in FIG. 2c, new control region 270 is located in data region 265. It is noted that subframe 260 has no PDCCH since a first control region is absent.

Figure 2D:
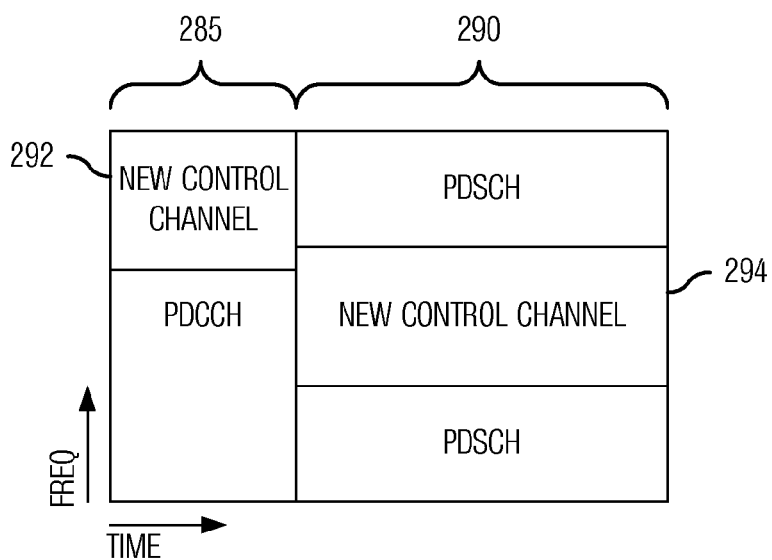

FIG. 2d illustrates a fourth subframe 280. Subframe 280 comprises a control region 285 and a data region 290. As discussed above, control region 285 may include control signaling, while data region 290 may include data as well as control signaling. The new control channel may be located in a first new control region 292, which may be inside control region 285, as well as in a second new control region 294, which may be inside data region 290.

In 3GPP LTE Release-10 and previous releases, a search space may be used to define possible locations for a PDCCH within the PDCCH control region. The PDCCH control region comprises one or more control channel elements (CCEs). There is a mapping procedure for assigning the resource elements that comprise each CCE to a both time location and frequency location, i.e., resources, within the PDCCH control region. A particular PDCCH may occupy 1, 2, 4, or 8 consecutive CCEs. A UE may use search space rules to identify possible CCEs that contain control information, such as, resource assignments (i.e., a PDCCH), for it. The search space rules may also have provisions for a common search space.

Figure 3A:
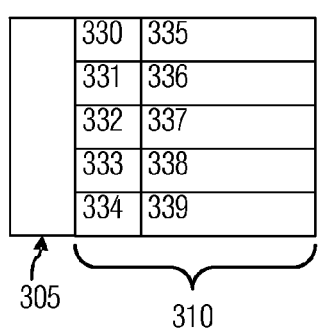
FIGS. 3a through 3e illustrate example locations for a second control region in a data region according to example embodiments described herein.

FIG. 3a illustrates a diagram of possible locations for a second control region in a data region 310 of a subframe. Also shown in FIG. 3a is a first control region 305. Data region 310 comprises one or more RBs (each of which comprises a plurality of resource elements or a plurality of control channel elements) in the first slot (RBs 330, 331, 332, 333, and 334) and one or more RBs in the second slot (RBs 335, 336, 337, 338, and 339). In FIG. 3a, examples of adjacent RBs in the first slot are 330 and 331, 331 and 332, and the like. Similarly, examples of adjacent RBs in the second slot are 336 and 337, 338 and 339, and the like.

Figure 3B:
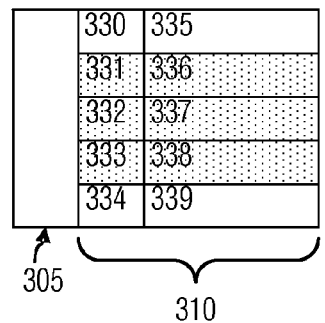
Figure 3C:
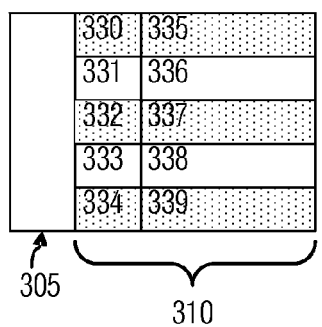

FIG. 3b illustrates an example U-PDCCH control region within data region 310 of a subframe, with the U-PDCCH control region occupying adjacent RBs. As shown in FIG. 3b, the U-PDCCH control region may occupy adjacent RBs, such as 331, 332, 333, 336, 337, and 338 for U-PDCCH 320. FIG. 3c illustrates an example U-PDCCH control region with data region 310 of a subframe, with the U-PDCCH control region occupying distributed VRBs. As shown in FIG. 3c, the U-PDCCH control region may occupy distributed VRBs using 330, 332, 334, 335, 337, and 339 for U-PDCCH 321.

Figure 3D:
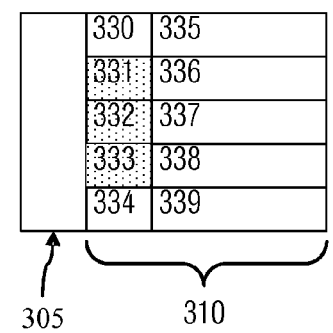
Figure 3E:
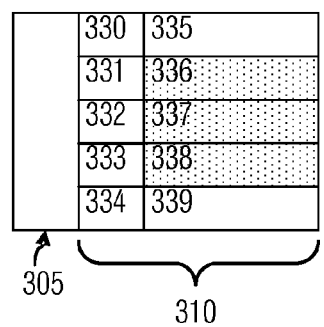

FIG. 3d illustrates an example U-PDCCH control region within data region 310 of a subframe, with the U-PDCCH control region occupying first slot RBs. As shown in FIG. 3d, the U-PDCCH control region may occupy the first slot using RBs 331, 332, and 333 for U-PDCCH 322. FIG. 3e illustrates an example U-PDCCH control region within data region 310 of a subframe, with the U-PDCCH control region occupying second slot RBs. As shown in FIG. 3e, the U-PDCCH control region may occupy the second slot using 336, 337, and 338 for U-PDCCH 323. It is also noted that the U-PDCCH control region may occupy RBs that are combinations of those illustrated herein. It is noted that although first control regions are shown in FIGS. 3a through 3e, in some subframes, the first control region may be absent.

In a communications system with relay nodes, a R-PDCCH may be used to transmit control signaling for notifying RNs of the DL and/or UL grants on the Un link (the link between the eNB and the RN). However, the R-PDCCH may have limitations if it were used for UEs. The R-PDCCH may be used as a basis for designing a new control channel (herein referred to as a U-PDCCH) to allow UEs to be notified of their UL and/or DL grants.

There are some benefits of having a U-PDCCH and/or a U-PHICH. The U-PDCCH and the U-PHICH, as well as other control channels located in the data region (i.e., the second control region), may be referred to as data region control channels. For example, different cells may allocate orthogonal time-frequency resource (different second control regions) for the U-PDCCH and/or U-PHICH, thus the interference between U-PDCCH and/or U-PHICHs of different cells is significantly lowered. Another benefit may be that a dedicated reference signal, e.g., a demodulation reference signal, can be used for the second control region, in other words, second control region has its own reference signal for channel estimation during demodulation, thereby allowing more advanced transmission schemes, such as beam forming or precoding.

There are some benefits of having a PDCCH and a U-PDCCH and/or a U-PHICH. The PDCCH may be detectable by legacy UEs, which would not be able to detect the U-PDCCH and/or a U-PHICH. Furthermore, the ability to distribute some of control information to the U-PDCCH and/or the U-PHICH may enable the eNB to perform load balancing on the different control channels. Additionally, if the transmission of control information on a particular control region (e.g., the first control region or the second control region (i.e., the data region)) is failing, it may be possible to use a different control region to potentially achieve better transmission performance, Several properties make the U-PDCCH control region (the second control region or the data region) an attractive solution to mitigate the effects of interference on the DL:

1. A U-PDCCH control region may occupy a subset of frequency resources, thereby providing orthogonality for control channels in frequency domain from different HetNet layers unlike other time division multiplex (TDM) HetNet solutions (e.g., almost blank subframe (ABS)) which may provide orthogonality in time domain;

2. A U-PDCCH control region does not disrupt or conflict with the current physical data control channel (i.e., a PDCCH), so prior release UEs (i.e., legacy UEs) are not impacted and are without a reduction in peak data rate if the resource allocation of the U-PDCCH control region can be released dynamically which may be a problem with other frequency division multiplex (FDM) HetNet solutions;

3. With a U-PDCCH control region, it may be possible to reduce the number of symbols used for a PDCCH control region, thus to improve the overall capacity (e.g., the time granularity is $\frac{1}{14}$th in time with a normal cyclic prefix (CP), but can be much lower in frequency, e.g., $\frac{1}{50}$th for a 10 MHz deployment); and 4. It may be possible to use a Demodulation Reference Signal (DMRS) on the U-PDCCH control region. The use of the DMRS could create a more efficient control channel that may take advantage of technologies such as dynamic link adaptation, frequency selective resource allocation, and Multiple Input, Multiple Output (MIMO) transmission. Some of these improvements can be done for the PDCCH (e.g., link adaptation), but, for example, Multi-User MIMO (MU-MIMO) is better suited for the U-PDCCH.

Comparing to a backhaul link between a Donor eNB (DeNB) and the Relay (RN), there may be some unique properties of the access link between the eNB and the UE and hence some issues that should be considered:

a) A UE is generally mobile while a RN is typically stationary. This implies that fast link adaptation is more beneficial and desirable, and at the same time more difficult. A difficulty is due to the lack of another control channel to inform the transmission format of U-PDCCH as in the case of PDSCH. Another related issue is that due to mobility of the UE, the re-transmission rate for PDSCH of a UE tends to be higher than that of a RN;

b) A UE may read a PDCCH while a RN cannot. Therefore, PDCCH and U-PDCCH may co-exist for a UE and designs are needed to cope with and take advantage of the co-existence;

c) Since the number of UEs associated with a cell is typically be much larger than the number of RNs, a more efficient design of the U-PDCCH may be required to reduce overhead and ensure high performance;

d) Because the location of a RN can be carefully selected, it generally sees better channel quality compared to a UE. Therefore, there is a higher requirement for interference management for the UE, especially for the control channel; and e) No switching time is needed for a UE as in the case of RN.

The following is a discussion of exemplary scenarios illustrating the attractiveness of a U-PDCCH.

Scenario 1: HetNet Deployment

A HetNet deployment typically has an aggressor layer and a victim layer. At a given location in a deployment, the power received from an aggressor layer may be much greater than the power received from the victim layer. As an example, in a first deployment, a macro layer may be considered an aggressor to a victim pico layer. Alternatively, in a second deployment, a femto layer may be considered an aggressor to a victim macro layer. Taking as an example the macro-pico HetNet deployment scenario as described above, the macro cell layer may use the regular PDCCH as specified in 3GPP LTE Release-10. Data for macro-UEs, which are UEs assigned to a macro cell layer, can be scheduled anywhere in the data region. For example, to mitigate interference, power control can be applied on the downlink control channels so that low-power transmissions can be used for macro UEs. As a result, the macro cell layer can have a PDCCH for each subframe while the pico cell layers can use either PDCCH or U-PDCCH. It is noted that this is just one of many possible scenarios. For other scenarios, it can be beneficial for the macro layer to have a U-PDCCH as well.

Scenario 1a: Fixed Assignment of U-PDCCH to UEs

Figure 3F:
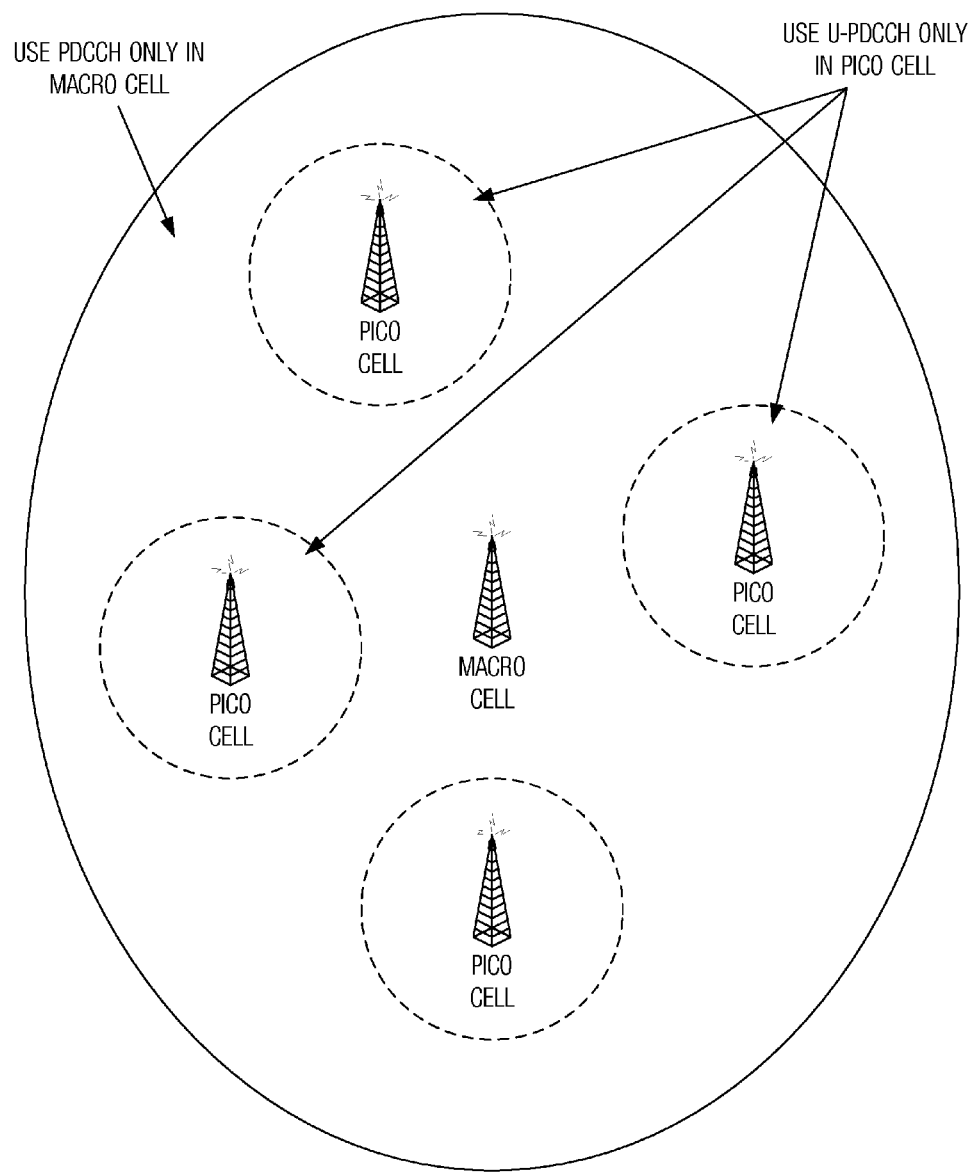
FIG. 3f illustrates an example HetNet communications system configured with fixed assignment of U-PDCCH to UEs according to example embodiments described herein.

In scenario 1a, pico-UEs, i.e., UEs assigned to a pico cell layer, are assigned one control channel only. Some UEs receive their assignments on the U-PDCCH only while other UEs receive their assignment on the regular PDCCH. The latter case may be needed for legacy UEs, for example. The pico eNB needs to transmit at least a common reference signal (CRS) on the PDCCH, with possibly more information, similar to Almost Blank Subframes (ABS). It is noted that the U-PDCCH may be interfered with by a reference signal (RS) sent by the macro cell. Muting and/or puncturing may be needed to mitigate the interference. FIG. 3f illustrates a HetNet communications system configured with a fixed assignment of U-PDCCH to UEs.

Scenario 1b: Flexible Assignment of U-PDCCH to UEs

Figure 3G:
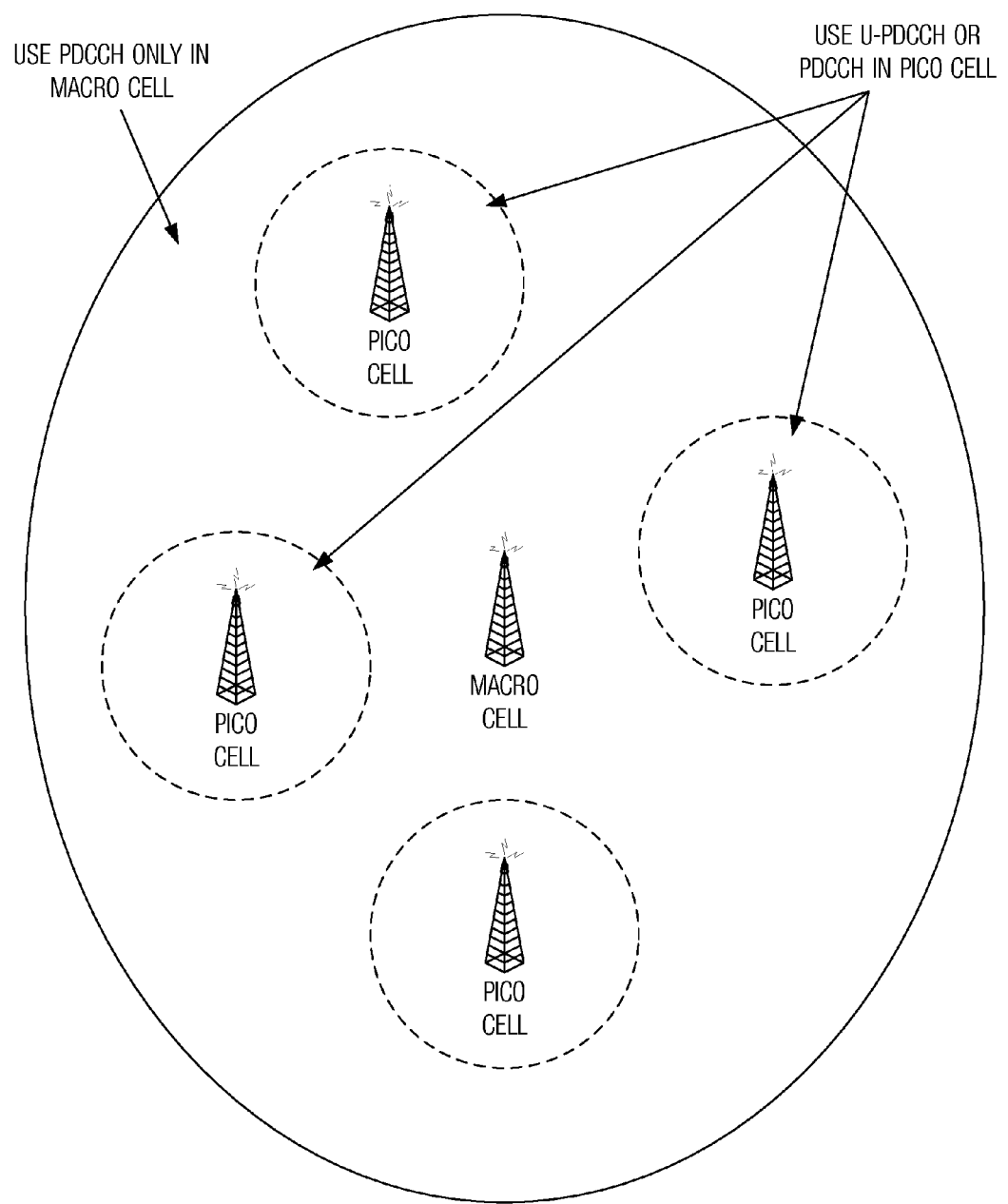
FIG. 3g illustrates an example HetNet communications system configured with flexible assignment of U-PDCCH to UEs according to example embodiments described herein.

In scenario 1b, the pico UEs may receive assignments either on the PDCCH or the U-PDCCH. For instance, pico UEs severely interfered by the macro cell's PDCCH may switch to the U-PDCCH while UEs having a manageable level of interference (e.g., UEs close to the pico cell) may continue to use the PDCCH. It is noted that the dynamic switching mechanism may also be useful to perform load balancing on the control channel region, for example. FIG. 3g illustrates a HetNet communications system configured with flexible assignment of U-PDCCH to UEs.

Scenario 2: CoMP Deployment

In scenario 2, the U-PDCCH may be used to avoid a potentially high level of interference between the PDCCH from two cells. A PDCCH in a first cell and a U-PDCCH in a second cell may be made orthogonal to help reduce interference. Orthogonalization is discussed in greater detail below. As in scenarios 1a and 1b discussed previously, fixed assignment and flexible assignment of the U-PDCCH may be used.

FIG. 4a illustrates a flow diagram of eNB operations in transmitting a resource assignment. eNB operations may be indicative of operations occurring in an eNB, such as eNB 105, as the eNB transmits a resource assignment. It is noted that although the discussion focuses on transmitting a resource assignment, example embodiments discussed herein are operable with control information in general. Therefore, the discussion of resource assignments should not be construed as being limiting to either the scope or the spirit of the example embodiments.

eNB operations may begin with the eNB generating control information, e.g., resource assignments (also commonly referred to as resource allocation assignments), configuration information, power control, codebook information, HARQ information, and the like, for a UE served by the eNB (block 400). As an example, the eNB may assign a RB to the UE. The eNB may select a location, e.g., a search space, for a control channel, such as a U-PDCCH, in which it may transmit the control information, such as resource assignment information, to the UE (block 405). As an example, for a U-PDCCH, the eNB may select resources in the data region, the control region, or both the data region and the control region to transmit the control information.

The eNB may map the control information onto resources, e.g., REs, RBs, and the like, in a subframe that corresponds to the location selected for the control channel (block 410). The eNB may send the subframe including the control channel to the UE (block 415). Since the U-PDCCH may be located in the data region (and/or the control region) and not in a fixed location like the PDCCH, the eNB may need to generate search space location information (block 420) and send location information, e.g., a location indicator, about the U-PDCCH to the UE (block 425). As an example, the eNB may send location information specifying which resources in the data region the U-PDCCH is located. As another example, the eNB may send location information specifying which resources in the data region the UE may search to find the U-PDCCH.

In general, the location information may specify a search space in which the control channel is located. As an example, the location information may specify a range of resources (e.g., resource elements, resource blocks, and the like) that include the control channel. The location information may also specify a specific location or multiple specific locations where the control channel may be located. As an example, the location information may specify specific resources or multiple specific resources where the control channel can be found. In other words, the location information may provide a region (or space) where the UE may be able to find the U-PDCCH, or the location information may provide a specific location (or locations) where the UE may be able to find the U-PDCCH.

FIG. 4b illustrates a flow diagram of UE operations in receiving control information, such as a resource assignment. UE operations may be indicative of operations occurring in a UE, such as UE 110 and UE 120, as the UE receives a resource assignment. It is noted that although the discussion focuses on transmitting a resource assignment, example embodiments discussed herein are operable with control information (e.g., resource assignments, configuration information, power control, codebook information, HARQ information, and the like) in general. Therefore, the discussion of resource assignments should not be construed as being limiting to either the scope or the spirit of the example embodiments.

UE operations may begin with the UE receiving location information for a U-PDCCH including the control information, e.g., the resource assignment, from the eNB (block 450). As an example, the location information may include which resources in a data region the U-PDCCH is located. As another example, the location information may include which resources in the data region the UE may search to find the U-PDCCH. In other words, the location information may provide a region (or space) where the UE may be able to find the U-PDCCH, or the location information may provide a specific location (or locations) where the UE may be able to find the U-PDCCH. As an example, the UE may receive location information for each subframe. As another example, the UE may receive location information that is valid for a number of subframes. As another example, the UE may receive location information that is valid for a specified time period. As another example, the UE may receive location information that is valid until additional location information is received. As another example, the UE may retrieve location information stored in its own memory or an external memory. The UE may search for the U-PDCCH, e.g., control information (possibly modulated control information) of the U-PDCCH (block 455) and demodulate the control information from the modulated control information in the U-PDCCH once it finds the U-PDCCH (block 460).

When the U-PDCCH is present, it is located in the data region (and/or the control region) and may be multiplexed with data channel. The UEs need to be able to locate the U-PDCCH, both in time and frequency. Therefore, there is a need for systems and methods to signal to a UE where to find the U-PDCCH control region, from which, the UE may locate the U-PDCCH.

The example embodiments presented herein provide support for both legacy UEs (defined for LTE Release-X and earlier, where X can be a release number such as Release 10.) and newer UEs (defined for LTE Release-X+1 and later). The eNB may obtain information about the UE capabilities, such as the ability to support the U-PDCCH. Alternatively, this information may be obtained by, e.g., exchange of RRC signaling. If a UE cannot support the U-PDCCH, the eNB may use the PDCCH for that UE (and disallow the UE from accessing the U-PDCCH control region for the U-PDCCH). Similarly, the eNB may use a combination of the U-PDCCH and the PDCCH for UE capable of supporting the U-PDCCH.

After the UE determines which control channel it is to monitor, the UE may need to find the location of control channel region before applying search space rules. If the control channel is in the PDCCH control region, then by default, the PDCCH control region is located at the beginning of a subframe. However, if the control channel is the U-PDCCH control region, then both the eNB and UE need to determine the location of the U-PDCCH control region. Once the location of the U-PDCCH control region is defined, the eNB can place a particular U-PDCCH according to search space rules. Similarly, the UE can search for a particular U-PDCCH using search space rules. Several different techniques are possible for specifying the search space for the UE in the frequency domain, including:

1. Semi-Static Configuration;
2. Blind Decoding of Multiple Locations;
3. Dynamically Indicated by a Control Channel; and
4. Pre-defined and/or Shared Search Spaces for U-PDCCH An example technique that may be used for specifying the search space is semi-static configuration. In semi-static configuration, which is similar to the R-PDCCH as defined for relays introduced in 3GPP LTE Release-10, each UE may be assigned a specific search space through higher layer signaling. The features described for the U-PDCCH can be applied to the R-PDCCH. One such feature may be allowing the use of a common search space. The common search space minimizes the effects of collisions between candidate sets of different UEs. It is noted that one UE (e.g., UE1) may have several possible U-PDCCH locations and potential aggregation levels in its candidate set. A second UE (e.g., UE2) may also have several possible U-PDCCH locations and potential aggregation levels in its candidate set. Collisions may occur if one or more elements of UE1's candidate set are in common with elements of UE2's candidate set. Within the search space, the UE may blindly search for control information, including both the downlink (DL) and uplink (UL) resource allocations, on the first and second slots of a subframe, respectively.

The semi-static configuration solution may be suboptimal for UEs, since UEs may be mobile, a search space within the U-PDCCH region may be subject to the deleterious effects of frequency selective fading and interference from neighboring cells.

Another technique that may be used for specifying the search space is blind decoding of multiple locations. In blind decoding of multiple locations, the eNB may provide explicitly configured (through upper layer signaling such as RRC, for example) or implicitly defined locations for U-PDCCH searching by the UE. The UE may then blindly decode all the locations as provided by the eNB to find its U-PDCCH. In order to limit the number of blind decoding attempts, the size of the search space for each location or the number of blind decoding for each location may be defined or otherwise limited.

Yet another technique that may be used for specifying the search space is to dynamically indicating the search space by a control channel. With specifying the search space for the UE using the dynamically indicated by a control channel technique, the location of the U-PDCCH may be indicated dynamically through a physical layer control channel or a Layer one (L1) control channel. Dynamically means that the indication may be sent on a subframe-by-subframe basis, and thus may be ill-suited for transmission using higher layer signaling.

Figure 5A:
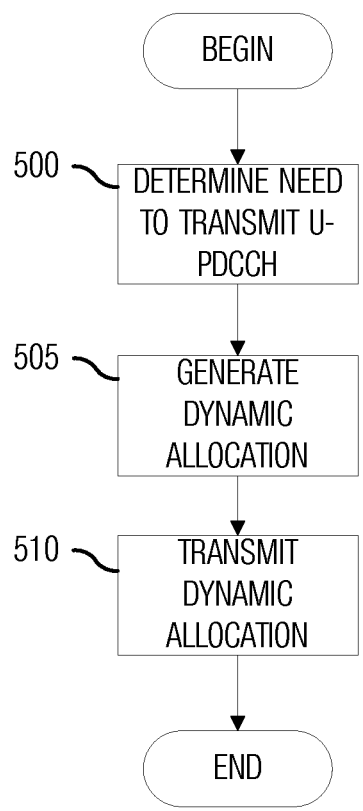
FIG. 5a illustrates an example flow diagram of eNB operations for dynamically indicating a location of the U-PDCCH according to example embodiments described herein.

FIG. 5*a* illustrates a flow diagram of eNB operations for dynamically indicating a location of the U-PDCCH. eNB operations may be indicative of operations occurring at an eNB, such as eNB 105, as the eNB dynamically indicates the location of a U-PDCCH.

eNB operation may begin with the eNB determining a need or not a need to have a U-PDCCH region (block 500). As an example, the eNB may determine that there is not a need to have a U-PDCCH if it is serving UEs that are not compatible with U-PDCCHs, if noise in the control region is not a problem, if load balancing in the control region is not a problem, and the like. Conversely, the eNB may determine that there is a need to have a U-PDCCH if it is serving UEs that are compatible with U-PDCCHs, if noise in the control region is a problem, if load balancing in the control region is a problem, and the like.

The eNB may generate a dynamic allocation indicator (block 505). As an example, the eNB may generate a UE Control Format Indicator Channel (U-PCFICH), a hierarchical PDCCH, and the like. Detailed discussion of the U-PCFICH and the hierarchical PDCCH is provided below. The eNB may transmit the dynamic allocation indicator (block 510). As an example, the U-PCFICH may be transmitted in the data region of a subframe, while the hierarchical PDCCH may be transmitted in the control region of a subframe.

Figure 5B:
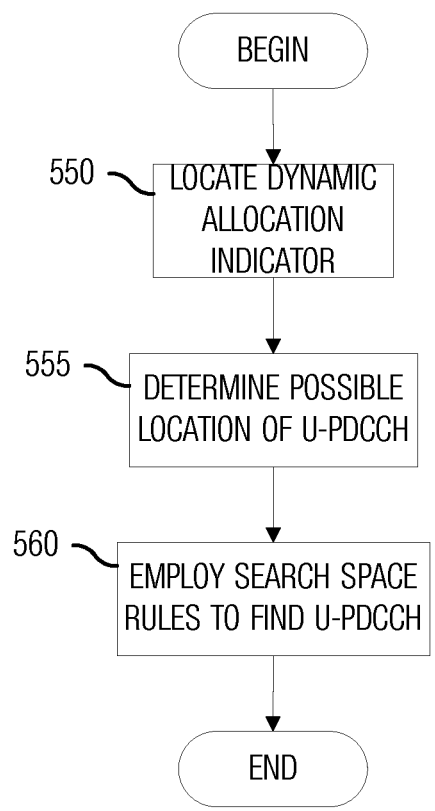
FIG. 5b illustrates an example flow diagram of UE operations in searching for the U-PDCCH, wherein the U-PDCCH is dynamically indicated according to example embodiments described herein.

FIG. 5*b* illustrates a flow diagram of UE operations in searching for the U-PDCCH, wherein the U-PDCCH is dynamically indicated. UE operations may be indicative of operations occurring in a UE, such as UE 110 and UE 120, as the UE searches for the U-PDCCH that is dynamically indicated by an eNB.

UE operations may begin with the UE locating the dynamic allocation indicator transmitted by the eNB (block 550). As discussed previously, the dynamic allocation indicator may be a U-PCFICH transmitted in a data region of a subframe or a hierarchical PDCCH transmitted in a control region of a subframe. A detailed discussion of the U-PCFICH and the hierarchical PDCCH is provided below.

The UE may determine the absence or presence of a U-PDCCH region according to the dynamic allocation indicator, and if the U-PDCCH region is present, the location of the U-PDCCH region may be determined from the dynamic allocation indicator (block 555). The UE may then apply relevant search space rules for the PDCCH and, if present, for the U-PDCCH region, to find the U-PDCCH (block 560). A discussion of search space rules is provided below.

It is noted that in order to reduce the signaling overhead, the dynamic allocation indicator may not be present in all subframes. For instance, if for a plurality of subframes, the U-PDCCH control region is located at the same position, the eNB may send the dynamic allocation indicator on the first subframe only and the same dynamic allocation indicator may be used for the remainder of the subframes. The UE may assume that the allocation is valid until overwritten by a new dynamic allocation allocator.

There may be several different ways to indicate the control region of a data region (and/or control region) control channel, i.e., its search space.

I) Use a U-PCFICH to indicate the control region (i.e., the search space). For UEs, a Control Format Indicator (CFI)-like concept can be derived. A new channel, the U-PCFICH is defined, with the U-PCFICH being found on pre-assigned (a priori) resources known by the UE. This can be done in a manner similar to the PDCCH. For example, the U-PCFICH location may be derived from the cell ID. The U-PCFICH may be located in the U-PDCCH control region.

The U-PCFICH may provide more information than the PCFICH. For the PDCCH region, the only information needed is the number of assigned symbols for the PDCCH region. However, for the U-PDCCH, the information conveyed by the U-PCFICH may comprise a set of resources (e.g., RBs) where the U-PDCCH might be located. Another example of the information in the U-PCFICH may be a pre-defined set of resources (e.g., RB) groups, with each resource (e.g., RB) group having a unique index. The index may then be transmitted on the U-PCFICH. Furthermore, it may be possible that channel coding is needed for the U-PCFICH so that errors can be detected on the set of resources (e.g., RBs) signaled.

Figure 6:
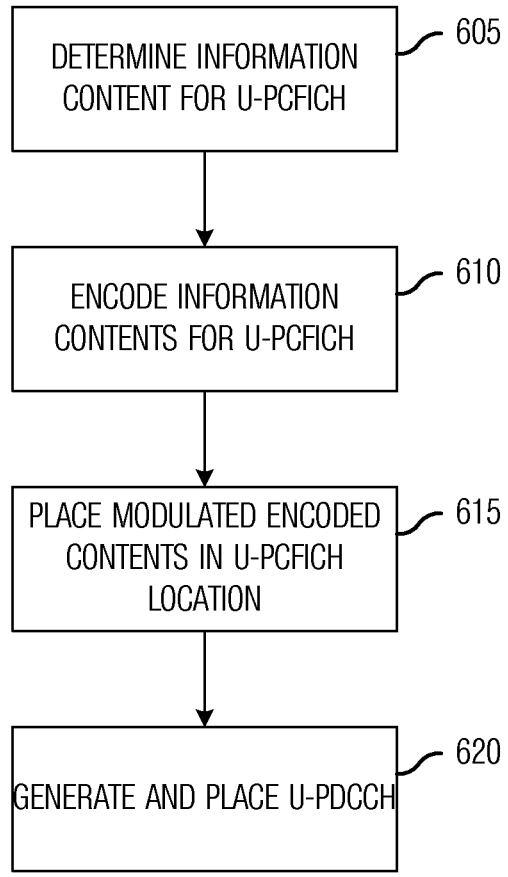
FIG. 6 illustrates an example flow diagram of eNB operations in indicating a control region with a U-PCFICH according to example embodiments described herein.

FIG. 6 illustrates a flow diagram of eNB operations in indicating a control region with a U-PCFICH. eNB operations may be indicative of operations occurring in an eNB, such as eNB 105, as the eNB uses a U-PCFICH to indicate a control region, such as a U-PDCCH control region.

eNB operations may begin with the eNB determining the information content of the U-PCFICH, such as the location of the U-PDCCH or the location of a search space for the U-PDCCH (block 605). As an example, the information content may include a set of resources (e.g., RBs) where the U-PDCCH may be located, an index to a pre-defined set of resource (e.g., RB) groups where the U-PDCCH may be located, and the like.

The information content may then be encoded (block 610). Encoding may comprise operations such as appending a cyclic redundancy check (CRC) code, scrambling, and/or generating a sequence of bits based on the content. The encoded and subsequently modulated content (where modulation may comprise the steps of mapping bits into symbols, precoding, and layer mapping) are placed in the U-PCFICH location (block 615). The eNB may then generate and place the U-PDCCH in resources corresponding to the locations defined by search space rules and by the information content of the U-PCFICH (block 620).

Figure 7:
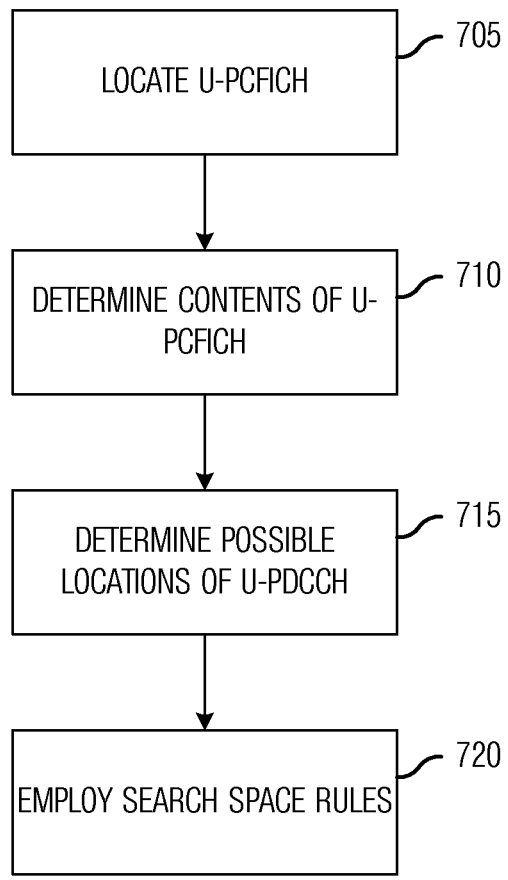
FIG. 7 illustrates an example flow diagram of UE operations in searching for a control region indicated by a U-PCFICH according to example embodiments described herein.

FIG. 7 illustrates a flow diagram of UE operations in searching for a control region indicated by a U-PCFICH. UE operations may be indicative of operations in a UE, such as UE 110 and UE 120, as the UE searches for a control region indicated by the U-PCFICH.

UE operations may begin with the UE locating the U-PCFICH (block 705). As discussed previously, the U-PCFICH may appear in pre-defined resources, in a manner similar to the PDCCH. Alternatively, the location of the U-PCFICH may also be derived from a cell identifier of the eNB. Alternatively, the U-PCFICH may be located in the data region. The UE may determine the contents of the U-PCFICH by processing the resources (block 710). Example examples of processing of the resources may include 1) demodulating and decoding and 2) waveform processing. The UE may determine the possible locations of U-PDCCH from the contents of the U-PCFICH (block 715). The UE may then search the possible locations using search space rules for its U-PDCCH (block 720).

II) Use the PDCCH to indicate U-PDCCH control regions (also commonly referred to as U-PDCCH assignments). One possibility may be to let the PDCCH carry control regions for the U-PDCCH. This structure may be referred to as a hierarchical PDCCH design, and may eliminate the need for a number of blind decoding of the U-PDCCH. It is noted however that blind decoding for the PDCCH may still be needed.

In the hierarchical design, information about the U-PDCCH control region (i.e., U-PDCCH assignments) on the PDCCH should be small for this solution to be attractive. As an example, the information about the control region may include: a UE ID, a starting resource (e.g., RB) index for both UL and DL, and an aggregation level. As another example, the contents of the assignment may include: possible location(s) of the U-PDCCH for a UE or group of UEs, modulation and/or coding used (Control Channel Elements (CCE)), antenna ports, and the like. In an extreme case, as previously described, a single 1-bit indicator may indicate the presence or absence of U-PDCCH.

It is noted that since the information is distributed on both the U-PDCCH and PDCCH, the Downlink Control Information (DCI) format on the U-PDCCH may be simplified. It is also noted that it might be useful to have the UE keep monitoring the common search space of the PDCCH to obtain paging information, group power control commands for uplink, System Information Block (SIB) information, and the like.

Figure 8:
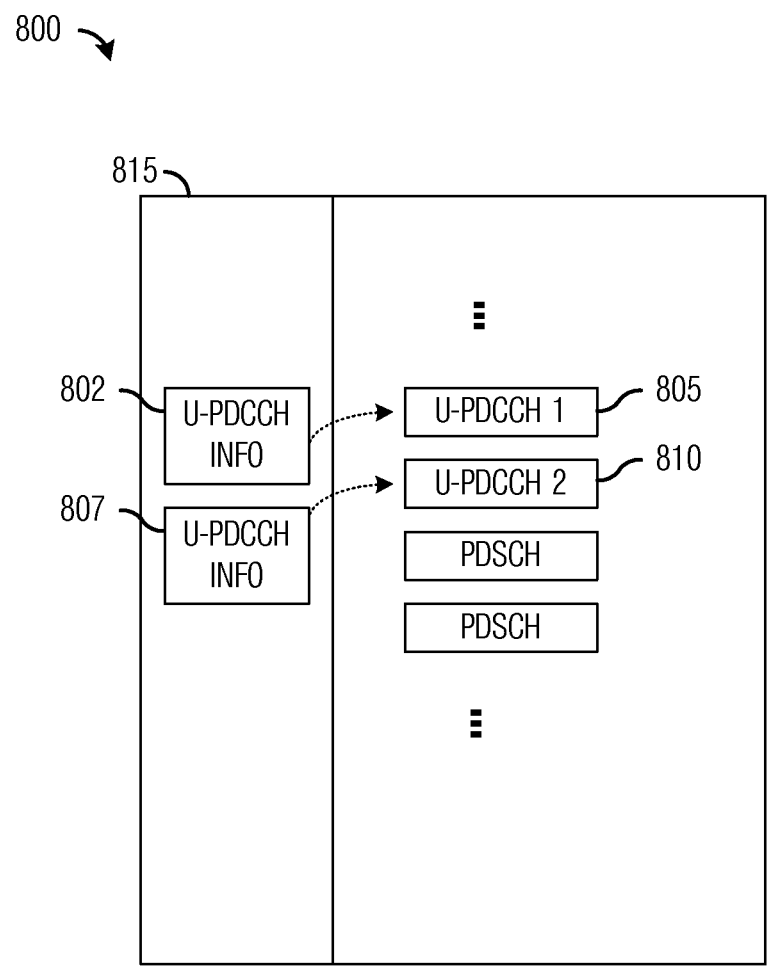
FIG. 8 illustrates an example subframe including a hierarchical PDCCH according to example embodiments described herein.

FIG. 8 illustrates a diagram of a subframe 800 including a hierarchical PDCCH. Hierarchical PDCCH includes information about U-PDCCH. As shown in FIG. 8, subframe 800 includes U-PDCCH information 802 for U-PDCCH 1 805 and U-PDCCH information 807 for U-PDCCH 2 810 in a control region 815. U-PDCCH information 802 and U-PDCCH information 807 make up the hierarchical PDCCH. As an example, the U-PDCCH information may include a UE ID, resource (e.g., RB) information (including time and frequency location), aggregation level, and the like. As another example, possible location(s) of the U-PDCCH for a UE or group of UEs, modulation and/or coding used (MCS), antenna ports, and the like, may be included in U-PDCCH information.

Figure 9A:
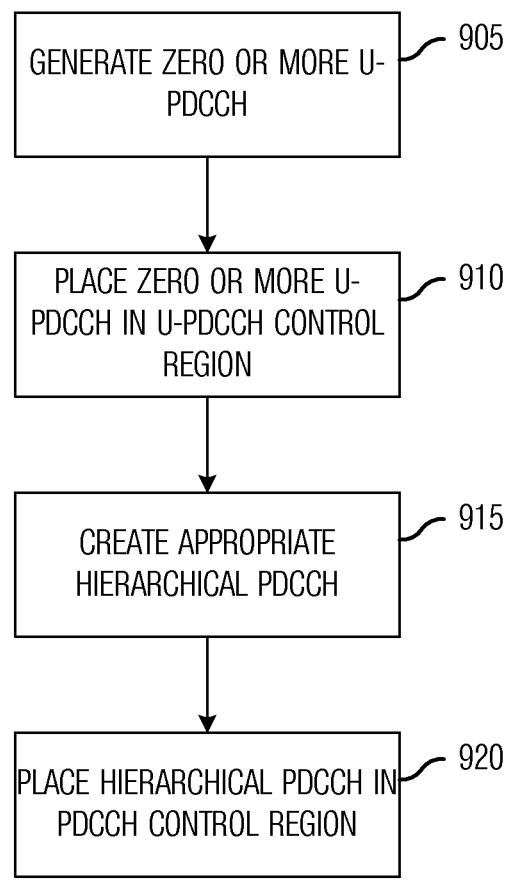
FIG. 9a illustrates an example flow diagram of eNB operations in indicating U-PDCCH assignments with a PDCCH according to example embodiments described herein.

FIG. 9a illustrates a flow diagram of eNB operations in indicating U-PDCCH assignments with a PDCCH. eNB operations may be indicative of operations occurring at an eNB, such as eNB 105, as the eNB indicates U-PDCCH assignments using a hierarchical PDCCH.

eNB operations may begin with the eNB generating zero or more U-PDCCHs (block 905). The zero or more U-PDCCHs may be intended for zero or more UEs. The eNB may place the zero or more U-PDCCHs in the U-PDCCH control region (block 910). It is noted that the U-PDCCHs remain in the data region although the dynamic allocation indicators are located in the hierarchical PDCCH. The eNB may create the appropriate (hierarchical) PDCCH contents for these U-PDCCHs (block 915). As an example, for each U-PDCCH, the eNB may generate as hierarchical PDCCH content: a UE ID, resource (e.g., RB) information (including time and frequency location), aggregation level, and the like. It is noted that if there is no U-PDCCH, the hierarchical PDCCH may not be created. This hierarchical PDCCH (if present) is then placed in the PDCCH control region (block 920).

Figure 9B:
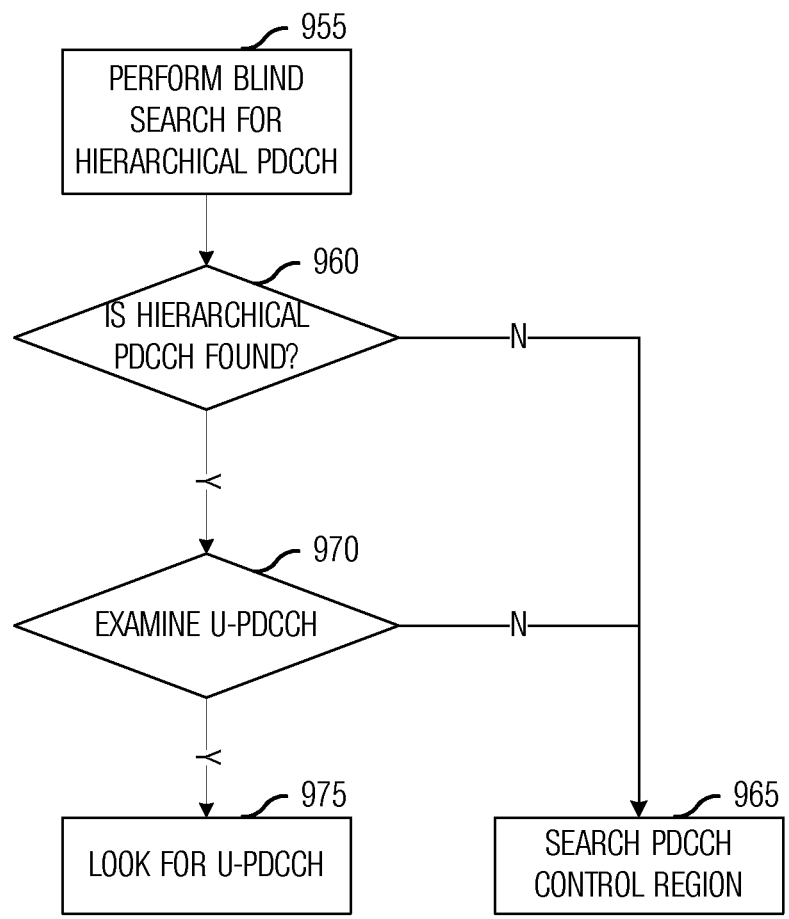
FIG. 9b illustrates an example flow diagram of UE operations in searching for a U-PDCCH, wherein the U-PDCCH assignment is indicated with a PDCCH according to example embodiments described herein.

FIG. 9b illustrates a flow diagram of UE operations in searching for a U-PDCCH, wherein the U-PDCCH assignment is indicated with a PDCCH. UE operations may be indicative of operations occurring in a UE, such as UE 110 and UE 120, as the UE searches for a U-PDCCH where the U-PDCCH assignment is indicated with a PDCCH.

UE operations may begin with the UE searching for the hierarchical PDCCH information using PDCCH search rules (e.g., blind decoding) (block 955). The UE may make a determination if hierarchical PDCCH information is found (block 960). If not found (as indicated by "N" for example), the UE may continue to perform blind decoding in the PDCCH control region (block 965). If found (as indicated by "Y" for example), the UE may examine the contents of the hierarchical PDCCH information to see whether the UE should examine the U-PDCCH (block 970). If not as indicated by "N" (for example), the UE may continue to perform blind decoding of the PDCCH (block 965). If yes as indicated by "Y", the UE may look for the U-PDCCH as specified in the hierarchical PDCCH information to obtain its PDSCH and/or PUSCH assignments (block 975).

A common search space for the U-PDCCH may be a desirable feature. In addition to minimizing the effects of collisions between candidate sets, the common search space may indicate, e.g., when the UE-specific search space is modified. The UE may first look at the common search space. If a message is found, it may indicate that the UE-specific search space is reconfigured. The message may convey the information about the reconfigured new search space. The common search space may also be used in the same way as a common PDCCH search space.

Pre-defined and/or shared search spaces for U-PDCCH. The example embodiments presented above for specifying the search space for the UE may be related to the frequency location of the U-PDCCH, which may have been either an actual location (actual resources (e.g., RBs, REs, and the like)) occupied by the U-PDCCH) or a U-PDCCH search space. In general, a search space may be specified as a set of resources (e.g., RBs) where the U-PDCCH is located. The U-PDCCH may or may not occupy all resources of the search space. The search space can comprise both a common search space and a specific search space or just a specific search space.

Several example embodiments are provided below to indicate the U-PDCCH search space for the UE(s). The solutions may be compatible and complementary with the previously described example embodiments for indicating the frequency location of the U-PDCCH or the U-PDCCH search space.

i) Indicate the U-PDCCH search space by using pre-defined search space subsets. For each particular UE, sending a list of the resources comprising the search space might incur high overhead (which may not necessarily be a major problem if search space reconfiguration is rare). In order to alleviate the overhead problem, a set of possible search spaces might be limited to a reasonable number, e.g., 16, 32, 64, and the like. The resources of a given search space are known a priori by the UE, as an example, a set of such search spaces may be defined in the specifications or by an operator of the communications system. Although pre-defined search spaces may be problematic, given that the configuration of the pre-defined search spaces is dependent on the bandwidth of the communications system, the configuration of the pre-defined search spaces may also be configured by higher layer signaling. Then, with the pre-defined search spaces, rather than sending the entire list of resources for the search space, the eNB may simply send an index of one or more of the pre-defined search spaces, so that only a number of bits are needed to indicate possible search spaces within a set of possible search spaces. As an example, with 32 pre-defined search spaces, the eNB may only send a 5 bit long index to indicate a single pre-defined search space.

Figure 10:
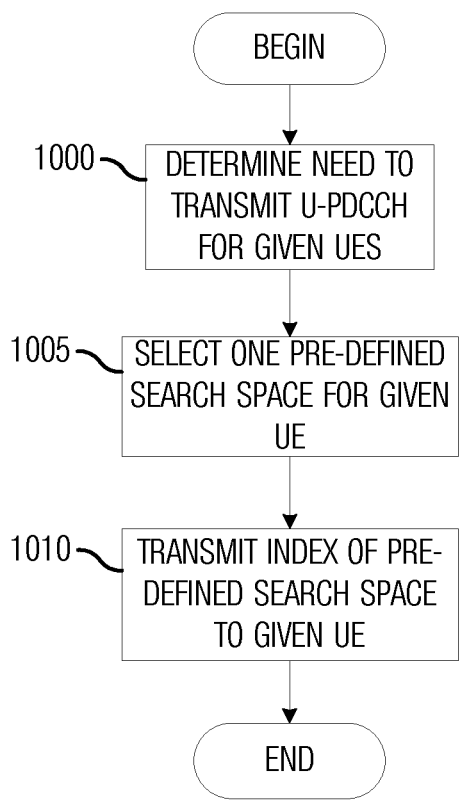
FIG. 10 illustrates an example flow diagram of eNB operations in indicating U-PDCCH search spaces using pre-defined search space subsets according to example embodiments described herein.

FIG. 10 illustrates a flow diagram of eNB operations in indicating U-PDCCH search spaces using pre-defined search space subsets. eNB operations may be indicative of operations occurring in an eNB, such as eNB 105, as the eNB indicates U-PDCCH search spaces using pre-defined search spaces.

eNB operations may begin with the eNB determining a need to send the U-PDCCH for a given UE (block 1000). As an example, the eNB may determine that there is not a need to have a U-PDCCH if it is serving UEs that are not compatible with U-PDCCHs, if noise in the control region is not a problem, if load balancing in the control region is not a problem, and the like. Conversely, the eNB may determine that there is a need to have a U-PDCCH if it is serving UEs that are compatible with U-PDCCHs, if noise in the control region is a problem, if load balancing in the control region is a problem, and the like.

The eNB may select one or more pre-defined search spaces for each UE (block 1005). As an example, if the eNB determined that there are 10 UEs to which it will send U-PDCCHs, the eNB may select 10 pre-defined search spaces for the 10 UEs. As another example, if the eNB has a need to send a significant amount of information to a particular UE, the eNB may select multiple pre-defined search spaces for the particular UE. The eNB may transmit the index (indices) of the selected one or more pre-defined search spaces to the UE (block 1010). As an example, the index (indices) of the selected one or more pre-defined search spaces may be transmitted to the UE in a control channel, such as a PDCCH.

Figure 11:
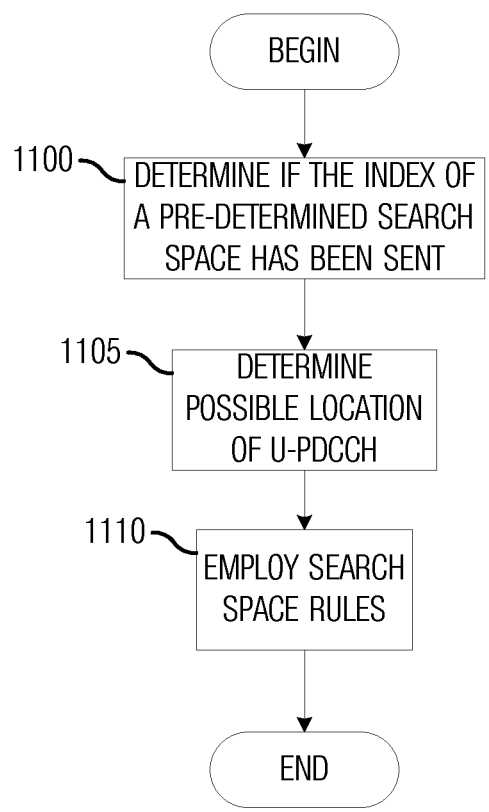
FIG. 11 illustrates an example flow diagram of UE operations in searching for a U-PDCCH in a search space, wherein the search space is indicated using pre-defined search space subsets according to example embodiments described herein.

FIG. 11 illustrates a flow diagram of UE operations in searching for a U-PDCCH in a search space, wherein the search space is indicated using pre-defined search space subsets. UE operations may be indicative of operations occurring at a UE, such as UE 110 and UE 120, as the UE searches for a U-PDCCH in a search space that is a pre-defined search space.

UE operations may begin with the UE determining if an index of a pre-defined search space has been sent by the eNB (block 1100). As an example, the UE may search a PDCCH (either a common search space in the PDCCH or a UE-specific PDCCH) to determine if the eNB has sent the index of a pre-defined search space to the UE. According to the determination, the UE may determine the presence or absence of the pre-defined search space and its location (block 1105), and if present the UE may use search space rules with the pre-defined search space uniquely identified by the index to search for the U-PDCCH (block 1110).

The eNB may use one of the previously described techniques, such as sending an indication on the PDCCH or using a U-PCFICH, to transmit an indication of the index or indices. In order to reduce overhead, the indication sent could be sticky (e.g., persistent), and the UE may consider the indication valid until overridden by a new one. Also, the set of pre-defined search spaces may be implemented in the memory of the UE, which may be communicated to the UE when the UE enters the network, or may be communicated to the UE by higher layer signaling.

It is noted that the use of pre-defined search spaces may result in a reduction in frequency selectivity. However, if the pre-defined search spaces are sufficiently large, the reduction in frequency selectivity may be small. Furthermore, if there is a relatively large number of pre-defined search spaces, e.g., on the order of 32 or 64, then the reduction in frequency selectivity may be made smaller.

ii) Indicate the U-PDCCH search space by using shared search spaces. With shared search spaces, a common search space may be used for several UEs. As an example, a group of UEs may be assigned a Search Space Radio Network Temporary Identifier (SS-RNTI) through higher layer signaling and each group of UEs with the same SS-RNTI shares the same search space. When a search space reconfiguration occurs, a multicast message with the new resource allocation (i.e., the new search space) may be sent to all the UEs with the same SS-RNTI. There may be several options to the multicast message. An example option may be to indicate its presence using the common search space of the PDCCH region (or U-PDCCH region).

The SS-RNTI value may not need to be explicitly defined. For example, the grouping may also be according to the last digit of the UE RNTI, or any other specified digit or digits of the UE RNTI. The SS-RNTI may also be defined when the UE enters the network or the cell, or may be communicated by higher layer signaling.

It may also be possible to avoid having to send the search space for a given RNTI. As an example, if M SS-RNTI values are used and if M pre-defined search spaces are known a priori by the UE, then the UE may simply use a pre-defined search space with an index corresponding to the SS-RNTI value (or a last digit of the SS-RNTI value or several specified digits of the SS-RNTI). To increase spectral efficiency, the example embodiments discussed above (using pre-defined search space subsets and sharing search spaces) may be combined.

The above example embodiments provide solutions for indicating a frequency location of the U-PDCCH. Similarly, a time location of the U-PDCCH may also need to be defined. For example, the R-PDCCH as defined for 3GPP LTE Release-10 always starts on the fourth symbol (e.g., symbol #3 using zero-based numbering). It may be desirable to have the U-PDCCH starting as early as symbol #0. This could occur, for an example, in a carrier designated as an extension carrier, which does not have a PDCCH region. In such as case, cross carrier scheduling or U-PDCCH would be used, with switching possible between the cross carrier scheduling and the U-PDCCH, as described previously, when both the U-PDCCH and PDCCH control regions are present.

Another possibility may be to use the PCFICH to obtain PDCCH length. For example, an eNB transmits both the PDCCH and the U-PDCCH. Since the U-PDCCH is located in the data region following the control region, the beginning location of the U-PDCCH may be related to the length of the control region (number of symbols used for the control region). As an example, if the length of the control region is 3 symbols, the U-PDCCH can begin on the fourth symbol of the subframe. In general, the starting location of the U-PDCCH may be length of the control region plus an offset. In the previous example, the offset is 0. For TDD systems, there may be one offset value for downlink subframes and another offset value for special subframes. As another example, for the special subframe, there may be one offset for centrally located RBs, e.g., the center 6 RBs, and another offset for the other RBs that are not centrally located.

Figure 12:
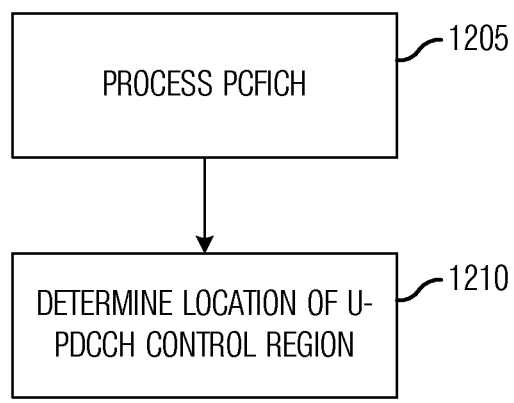
FIG. 12 illustrates an example flow diagram of UE operations in searching for U-PDCCH using a PCFICH according to example embodiments described herein.

FIG. 12 illustrates a flow diagram of UE operations in searching for U-PDCCH using a PCFICH. UE operations may be indicative of operations occurring in a UE, such as UE 110 and UE 120, as the UE searches for a U-PDCCH using a PCFICH.

UE operations may begin with the UE determining a temporal duration (e.g., a CFI value) of the PDCCH control region from the PCFICH (block 1205). As an example, the PCFICH may specify the temporal duration of the PDCCH control region. The UE may determine the starting point of the U-PDCCH control region according to the end of the PDCCH control region as determined from the PCFICH and an offset if any (block 1210). As an example, the UE may determine the starting point of the U-PDCCH control region according to the end of the PDCCH control region and how a starting offset for the U-PDCCH control region is configured, e.g., the U-PDCCH control region may start on a symbol immediately following the PDCCH control region, or one or more symbols later. The starting offset for the U-PDCCH control region may be explicitly stated in the standard or may be provided by higher layer signaling, e.g., RRC or SIB.

As another example, in a HetNet deployment, a pico-eNB may not transmit the PDCCH. The UE associated with the pico-eNB may determine the starting point of the U-PDCCH by reading the PCFICH of the macro eNB, for example. It is noted that in such a situation, a symbol of guard time may be needed to account for a time difference between receiving signals from the macro eNB and the pico-eNB, respectively. It is also noted that the UE may need to maintain synchronization with two eNBs, i.e., the macro eNB and the pico-eNB.

As an example, the starting point of the U-PDCCH may be signaled by higher layer signaling, for example, RRC signaling. It is noted that the use of higher layer signaling may be relatively inefficient since the higher layer signaling may need to be transmitted to the UEs. However, a SIB-type mechanism could be used to help increase efficiency. Thus, using a broadcasting channel is preferable when higher layer signaling is used. In addition, there is the RRC time ambiguity.

As an example, a U-PCFICH channel can be used to signal the starting point of the U-PDCCH. A set of resources (e.g., time and/or frequency resources such as RBs, REs, and the like) may be allocated to the U-PCFICH channel. These resources may be known by the UE, and can be based on cell ID, for example. The U-PCFICH may indicate the starting point of the U-PDCCH. The U-PCFICH channel may not need to be transmitted on all subframes. If not transmitted on all subframes, the U-PDCCH may remain the same (i.e., its size, location, RBs used, and the like, remains unchanged) until a new U-PCFICH is received.

As an example, a hybrid fixed and/or variable starting point may be used for the starting point of the U-PDCCH. As an example, on some subframes, the U-PDCCH starting point might be known and fixed, whereas on another subframe, it may vary. For instance, on subframe 0, the UE may assume that the U-PDCCH is always at a fixed location. On subframe 0, the UE may receive an indication of the starting point for the U-PDCCHs for other subframes that have U-PDCCHs, and may use it for other subframes. The eNB may split the available set of subframes into two (or more) subsets. As an example, there may be two subsets of subframes: a first subset S1 where the U-PDCCH starting point is fixed to, e.g., the fourth symbol, and a second subset S2 where the U-PDCCH starting point is variable, and may be determined by any of the methods previously described. The UEs have knowledge of the two subsets. The knowledge of the two subsets can be acquired by having the subsets hard-coded in the UE memory, the subsets communicated when the UE enters the network, or the subsets communicated by higher layer signaling, for example.

Figure 13A:
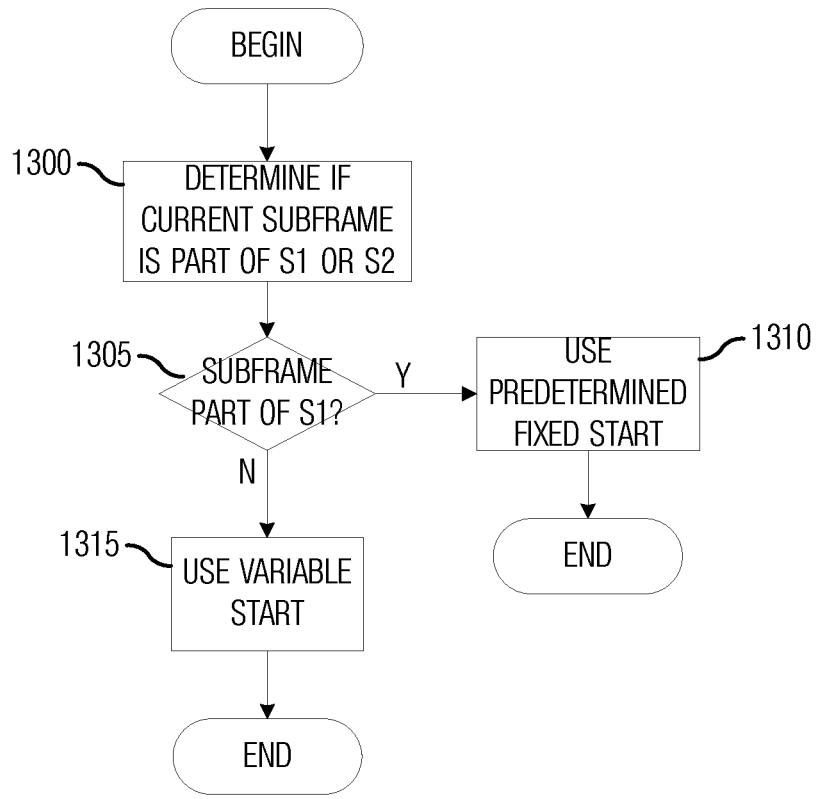
FIG. 13a illustrates an example flow diagram of eNB operations in using a hybrid fixed and/or variable starting point to indicate a U-PDCCH according to example embodiments described herein.

FIG. 13*a* illustrates a flow diagram of eNB operations in using a hybrid fixed and/or variable starting point to indicate a U-PDCCH. eNB operations may be indicative of operations occurring in an eNB, such as eNB 105, as the eNB uses a hybrid fixed and/or variable starting point technique to indicate a U-PDCCH.

For discussion purposes, considering a two subset configuration, eNB operations may begin with the eNB determining if the subframe is part of subset S1 or subset S2 (block 1300). As an example, the eNB may determine which subset the subframe belongs to according to a subframe index of the subframe. The eNB may assess if the subframe is part of subset S1 (block 1305). If the subframe is part of subset S1, then the eNB may use the fixed, predetermined starting point for the U-PDCCH starting point (block 1310). If the subframe is not part of subset S1, i.e., the subframe is part of the subset S2, then the eNB may use rules configured for the variable U-PDCCH starting point (block 1315). As another example, subset S1 may indicate which subframes have a U-PDCCH region only, while subset S2 may indicate which subframes have both U-PDCCH and PDCCH regions. As an additional example, subset S2 may indicate which subframes have a UE-specific search space in the data region.

There may be some variations of the hybrid fixed and/or variable starting point technique. As an example, some subframes may be part of both subsets S1 and S2. In such a situation, some priority rules may need to be applied, such as, a variable U-PDCCH starting point is assumed. Also, the subsets S1 and S2 may be defined on a per UE basis, a per group of UE basis, or be the same for all the UEs present in the cell.

As another example, if a particular UE does not know the rule for variable starting point for a particular subframe, the UE may assume that it has no assignment on the particular subframe, and may monitor frames pertaining to subset S1 only, until it receives an indication on how to find the starting position of the U-PDCCH control region on subset S2.

Figure 13B:
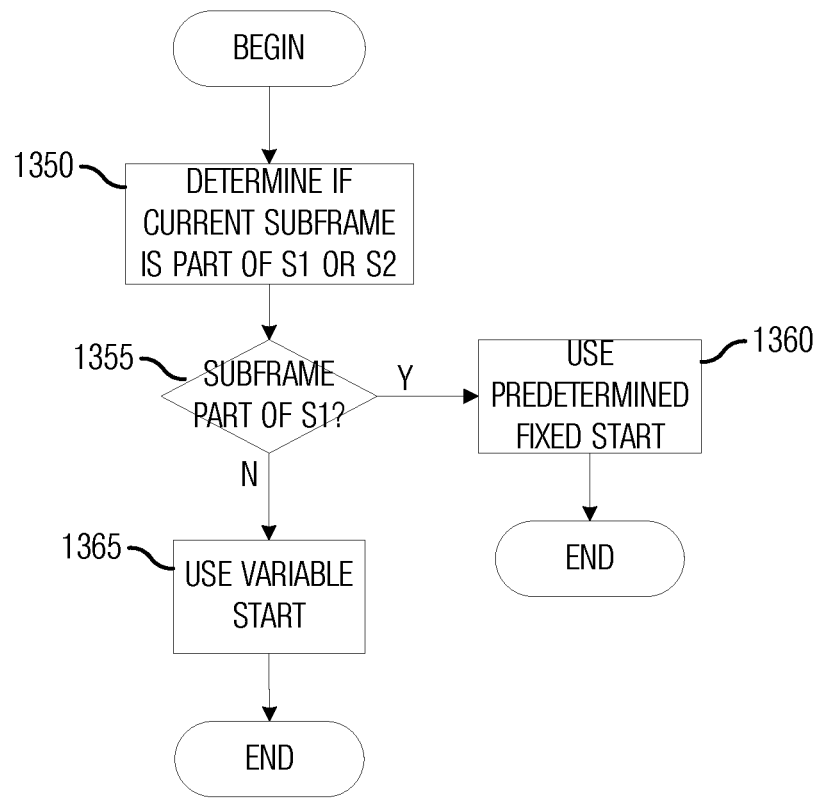
FIG. 13b illustrates an example flow diagram of UE operations in using a hybrid fixed and/or variable starting point to search for a U-PDCCH according to example embodiments described herein.

FIG. 13*b* illustrates a flow diagram of UE operations in using a hybrid fixed and/or variable starting point to search for a U-PDCCH. UE operations may be indicative of operations occurring in a UE, such as UE 110 and UE 120, as the UE uses a hybrid fixed and/or variable starting point technique to search for a U-PDCCH.

For discussion purposes, considering a two subset configuration, UE operations may begin with the UE determining if a subframe that it is receiving or has received is part of subset S1 or subset S2 (block 1350). As an example, the UE may determine which subset the subframe belongs to according to a subframe index of the subframe. The UE may assess if the subframe is part of subset S1 (block 1355). If the subframe is part of subset S1, then the UE may use the fixed, predetermined starting point for the U-PDCCH starting point and begin searching for the U-PDCCH there (block 1360). If the subframe is not part of subset S1, i.e., the subframe is part of the subset S2, then the UE may use rules configured for the variable U-PDCCH starting point and begin its search for the U-PDCCH there (block 1365). As another example, subset S1 may indicate which subframes have a U-PDCCH region only, while subset S2 may indicate which subframes have both U-PDCCH and PDCCH regions. As an additional example, subset S2 may indicate which subframes have a UE-specific search space in the data region.

Figure 14:
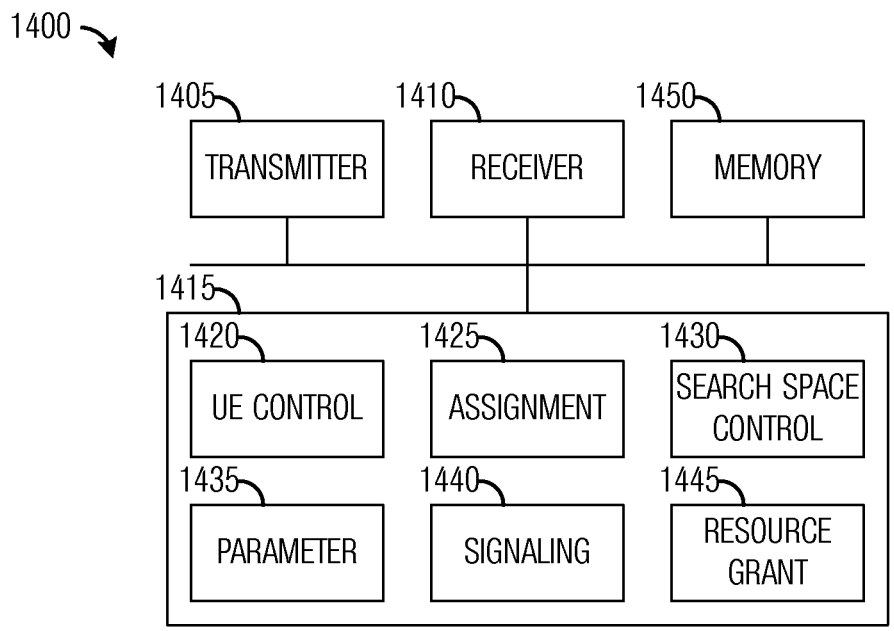
FIG. 14 illustrates an example first communications device according to example embodiments described herein.

FIG. 14 illustrates a first communications device 1400. Communications device 1400 may be used to implement various ones of the embodiments discussed herein. As shown in FIG. 14, a transmitter 1405 is configured to transmit information and a receiver 1410 is configured to receive information.

A UE controller 1420 is configured to determine which control channel(s) a UE is to monitor. The determination may be based on a number of factors, such as UE capability, communications system capability, and so on. UE controller 1420 is also configured to determine a need for a U-PDCCH based on a number of factors such as control channel load, UE capability, number of UEs, and so forth. An assignment unit 1425 is configured to assign a UE to monitor a control channel(s). For example, assignment unit 1425 may assign a UE to monitor a PDCCH, a U-PDCCH, or both PDCCH and U-PDCCH. A search space controller 1430 is configured to specify a search space or a set of search spaces (possibly out of a number of possible search spaces) where a UE may search to find a U-PDCCH. Search space controller 1430 is configured to generate a location indicator of the search space. A parameter unit 1435 is configured to select and/or assign communications parameters, such as rank, coding rate, modulation scheme, antenna port, and so forth, to a UE. A signaling unit 1440 is configured to generate messages and/or indications to be transmitted to a UE, where the messages and/or indications convey channel assignments, parameters, and so on. A resource grant unit 1445 is configured to grant network resources to UEs. A memory 1450 is configured to store information, such as channel assignment, parameters, etc.

The elements of communications device 1400 may be implemented as specific hardware logic blocks. In an alternative, the elements of communications device 1400 may be implemented as software executing in a processing unit such as processor (e.g., microprocessor or digital signal processor), controller, application specific integrated circuit, or so on. In yet another alternative, the elements of communications device 1400 may be implemented as a combination of software and/or hardware.

As an example, transmitter 1405 and receiver 1420 may be implemented as a specific hardware block, while UE controller 1420, assignment unit 1425, search space controller 1430, parameter unit 1435, signaling unit 1440, and resource grant unit 1445 may be software modules executing in a microprocessor or a custom circuit or a custom compiled logic array of a field programmable logic array.

Figure 15:
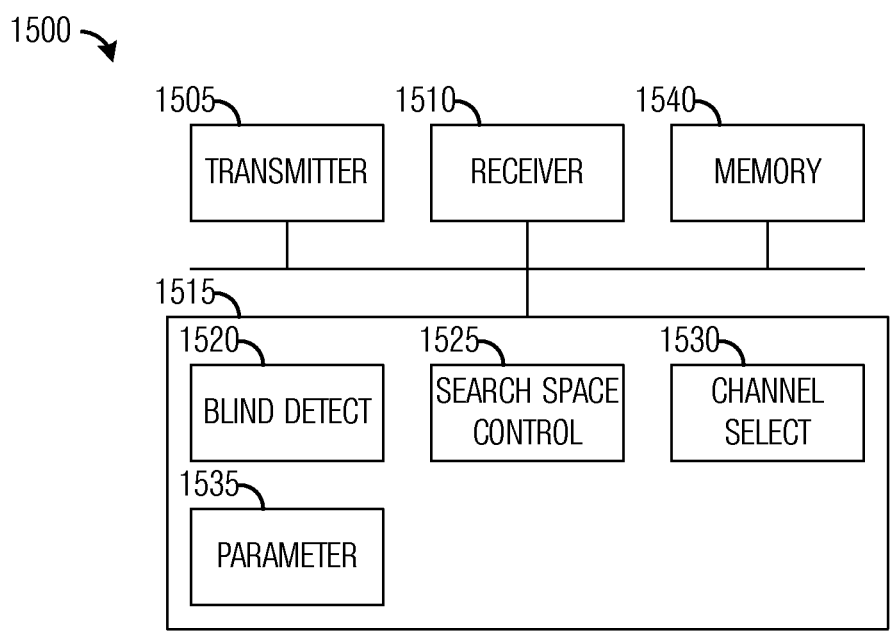
FIG. 15 illustrates an example second communications device according to example embodiments described herein.

FIG. 15 illustrates a second communications device 1500. Communications device 1500 may be used to implement various ones of the embodiments discussed herein. As shown in FIG. 15, a transmitter 1505 is configured to transmit information and a receiver 1510 is configured to receive information.

A blind detector 1520 is configured to detect transmissions by search a search space for the transmissions. A search space controller 1525 is configured to control the searches made by communications device 1500 based on search space(s) specified by an eNB controlling the communications device 1500. Search space controller 1525 is configured to use a location indicator provided by the eNB to control the searches made by communications device 1500. A channel selector 1530 is configured to select a control channel to monitor based on instructions from the eNB, power measurements, performance metrics, and so on. A parameter unit 1535 is configured to process communications parameters provided by the eNB. A memory 1540 is configured to store information, such as channel assignment, parameters, etc.

The elements of communications device 1500 may be implemented as specific hardware logic blocks. In an alternative, the elements of communications device 1500 may be implemented as software executing in a processing unit such as processor (e.g., microprocessor or digital signal processor), controller, application specific integrated circuit, or so on. In yet another alternative, the elements of communications device 1500 may be implemented as a combination of software and/or hardware.

As an example, transmitter 1505 and receiver 1520 may be implemented as a specific hardware block, while blind detector 1520, search space controller 1525, channel selector 1530, and parameter unit 1535 may be software modules executing in a microprocessor or a custom circuit or a custom compiled logic array of a field programmable logic array.

Advantageous features of embodiments of the disclosure may include: a method for wireless network node operations, the method comprising: determining a need for transmitting a U-PDCCH; generating a dynamic allocation for the U-PDCCH; and transmitting an indicator of the dynamic allocation.

The method could further include, wherein the indicator is sent only if there is a change in the allocated resources. The method could further include, wherein the indicator is sent on a pre-determined set of time-frequency resources in the subframes. The method could further include, wherein the pre-determined set of time frequency resources is located in the U-PDCCH control region. The method could further include, wherein a secondary indicator is sent on a Physical Dedicated Control Channel located in a first control region to indicate the location of the indicator for a second control region.

The method could further include, wherein the indicator is sent on a Physical Control Format Indicator Channel. The method could further include, wherein the indicator comprises a frequency search space allocation. The method could further include, wherein the indicator comprises a frequency allocation for the second control region. The method could further include, wherein the indicator is an index representing a pre-determined set of frequency resources.

The method could further include, wherein a plurality of remote wireless nodes is grouped together, and wherein the plurality of remote wireless nodes is sent the indicator in a message multicasted to the group of remote wireless notes. The method could further include, wherein the plurality of remote wireless nodes is referenced by a group index. The method could further include, wherein membership of a remote wireless node in plurality of remote wireless nodes is determined based on the remote wireless RNTI. The method could further include, wherein the message is sent in the common search space of a Physical Dedicated Control Channel region.

The method could further include, wherein the indicator comprises a time allocation. The method could further include, wherein a second control region starts on a first symbol of a subframe for carrier components where a first control region is absent. The method could further include, wherein a starting position of the second control region is determined by an offset from the end of the first region. The method could further include, wherein the offset is null. The method could further include, wherein for a first set of subframes, a starting point of a second region is fixed, and for a second set of subframes a starting point of the second region is variable.

Advantageous features of embodiments of the disclosure may include: a method for a wireless node operations, the method comprising: receiving an indication of a dynamic allocation for a U-PDCCH; and searching for the U-PDCCH based on the indication.

The method could further include, wherein the indicator is sent only if there is a change in allocated resources. The method could further include, wherein the indicator is received on a pre-determined set of time-frequency resources in the subframes. The method could further include, wherein the pre-determined set of time frequency resources is located in the U-PDCCH control region. The method could further include, wherein a secondary indicator is received on a Physical Dedicated Control Channel located in a first control region to indicate the location of the indicator for a second control region.

The method could further include, wherein the indicator is received on a Physical Control Format Indicator Channel. The method could further include, wherein the indicator comprises a frequency search space allocation. The method could further include, wherein the indicator comprises a frequency allocation for the second control region. The method could further include, wherein the indicator is an index representing a pre-determined set of frequency resources. The method could further include, wherein a plurality of wireless nodes is grouped together, and wherein the plurality of wireless nodes receives the indicator in a message multicasted to the group of wireless notes.

The method could further include, wherein the plurality of wireless nodes is referenced by a group index. The method could further include, wherein membership of a wireless node in plurality of wireless nodes is determined based on the remote wireless RNTI. The method could further include, wherein the message is received in the common search space of a Physical Dedicated Control Channel region. The method could further include, wherein the indicator comprises a time allocation.

The method could further include, wherein a second control region starts on a first symbol of a subframe for carrier components where a first control region is absent. The method could further include, wherein a starting position of the second control region is determined by an offset from the end of the first region. The method could further include, wherein the offset is null. The method could further include, wherein for a first set of subframes, a starting point of a second region is fixed, and for a second set of subframes a starting point of the second region is variable.

Advantageous features of embodiments of the disclosure may include: a wireless network node comprising: a control unit configured to determine a need for a U-PDCCH; a resource grant unit coupled to the control unit, the resource grant unit configured to grant resources for the U-PDCCH; and a transmitter coupled to the resource grant unit, the transmitter configured to transmit an indicator of the granted resources.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting control information to a wireless node in a communications system, the method comprising:
    mapping, by a communications controller, the control information onto resources associated with a wireless node specific search space, the wireless node specific search space being located in data regions of a first subset of subframes in a plurality of subframes, wherein the first subset of subframes further include a common search space in addition to the wireless node specific search space, and wherein the wireless node specific search space is excluded from data regions of a second subset of subframes in the plurality of subframes;
    generating, by the communications controller, a location indicator identifying which subframes and resource blocks are included in the wireless node specific search space;
    transmitting, by the communications controller, a first subframe to the wireless node; and
    transmitting, by the communications controller, the location indicator to the wireless node.

2. The method of claim 1, further comprising transmitting the location indicator in a control region of the first subframe.

3. The method of claim 1, wherein the location indicator is transmitted in the common search space.

4. The method of claim 1, further comprising transmitting the location indicator using higher layer signaling.

5. The method of claim 1, wherein the location indicator comprises a plurality of possible locations of the wireless node specific search space.

6. The method of claim 1, further comprising transmitting the location indicator to a group of wireless nodes including the wireless node.

7. The method of claim 6, wherein the group of wireless nodes is addressed by a group index.

8. The method of claim 6, wherein the group of wireless nodes comprises wireless nodes having a specified radio network temporary identifier.

9. The method of claim 1, wherein the data regions start on a first symbol of a given subframe in the first subset of subframes when a control region is absent from the given subframe.

10. The method of claim 1, wherein the data regions start on a first symbol after an end of a control region subframe plus an offset.

11. The method of claim 1, wherein the data regions start on a first symbol after an end of a control region.

12. The method of claim 1, wherein the location of the wireless node specific search space is shared by a group of wireless nodes.

13. The method of claim 1, wherein resources comprises resource elements.

14. The method of claim 1, wherein resources comprises resource blocks.

15. A method for receiving control information in a communications system, the method comprising:
    receiving, by a wireless node, a location indicator identifying which subframes and resource blocks are included in a wireless node specific search space, the wireless node specific search space being located in data regions of a first subset of subframes in a plurality of subframes, wherein the first subset of subframes further include a common search space in addition to the wireless node specific search space, and wherein the wireless node specific search space is excluded from data regions of a second subset of subframes in the plurality of subframes;
    searching, by the wireless node, for modulated control information in the wireless node specific search space; and
    demodulating, by the wireless node, the modulated control information to produce the control information.

16. The method of claim 15, further comprising receiving the location indicator in a control region of a first subframe.

17. The method of claim 16, wherein the location indicator is received in the common search space.

18. The method of claim 15, wherein the location indicator comprises a plurality of possible locations of a control channel including the control information.

19. The method of claim 15, further comprising receiving the location indicator in a message addressed to a group of wireless nodes having a specified radio network temporary identifier.

20. The method of claim 15, wherein the data regions start on a first symbol after an end of a control region of a given subframe plus an offset.

21. A communications controller comprising:
    a processor configured to map control information onto resources associated with a wireless node specific search space, the wireless node specific search space being located in data regions of a first subset of subframes in a plurality of subframes, wherein the first subset of subframes further include a common search space in addition to the wireless node specific search space, and wherein the wireless node specific search space is excluded from data regions of a second subset of subframes in the plurality of subframes, the processor being further configured to generate a location indicator identifying which subframes and resource blocks are included in the wireless node specific search space; and
    a transmitter operatively coupled to the processor, the transmitter configured to transmit a first subframe to a wireless node, and to transmit the location indicator to the wireless node.

22. The communications controller of claim 21, wherein the transmitter is configured to transmit the location indicator in a control region of the first subframe.

23. The communications controller of claim 22, wherein the transmitter is configured to transmit the location indicator in the common search space.

24. The communications controller of claim 21, wherein the transmitter is configured to transmit the location indicator to a group of wireless nodes including the wireless node.

25. The communications controller of claim 24, wherein the group of wireless nodes comprises wireless nodes having a specified radio network temporary identifier.

26. The communications controller of claim 21, wherein the transmitter is configured to transmit the location indicator using higher layer signaling.

27. A wireless node comprising:
    a receiver configured to receive a location indicator identifying which subframes and resource blocks are included in a wireless node specific search space, the wireless node specific search space being located in data regions of a first subset of subframes in a plurality of subframes, wherein the first subset of subframes further include a common search space in addition to the wireless node specific search space; and a processor operatively coupled to the receiver, the processor configured to search for modulated control information in the wireless node specific search space, and to demodulate the modulated control information to produce control information.

28. The wireless node of claim 27, wherein the receiver is configured to receive the location indicator in a control region of a first subframe.

29. The wireless node of claim 28, wherein the location indicator is received in the common search space.

30. The wireless node of claim 27, wherein the receiver is configured to receive the location indicator in a message addressed to a group of wireless nodes having a specified radio network temporary identifier.

* * * * *